(12) United States Patent
Chatterjee et al.

(10) Patent No.: US 9,600,070 B2
(45) Date of Patent: Mar. 21, 2017

(54) USER INTERFACE HAVING CHANGEABLE TOPOGRAPHY

(75) Inventors: Shuvo Chatterjee, Cupertino, CA (US); Quin C. Hoellwarth, Kuna, ID (US)

(73) Assignee: Apple Inc., Cupertino, CA (US)

( * ) Notice: Subject to any disclaimer, the term of this patent is extended or adjusted under 35 U.S.C. 154(b) by 1114 days.

(21) Appl. No.: 12/409,391

(22) Filed: Mar. 23, 2009

(65) Prior Publication Data
US 2010/0162109 A1    Jun. 24, 2010

Related U.S. Application Data

(60) Provisional application No. 61/140,050, filed on Dec. 22, 2008.

(51) Int. Cl.
| G06F 3/041 | (2006.01) |
| G06F 3/01 | (2006.01) |
| G06F 3/0488 | (2013.01) |

(52) U.S. Cl.
CPC .......... *G06F 3/016* (2013.01); *G06F 3/04886* (2013.01); *G06F 2203/04809* (2013.01)

(58) Field of Classification Search
CPC .......... G06F 3/016; G06F 2203/04103; G06F 2203/04102; G06F 3/0414
USPC ........................................................ 715/702
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 5,977,867 A | 11/1999 | Blouin |
| 6,188,391 B1 | 2/2001 | Seely et al. |
| 6,310,610 B1 | 10/2001 | Beaton et al. |
| 6,323,846 B1 | 11/2001 | Westerman et al. |

(Continued)

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: AMC Conference on Human Factors in Computing Systems*, pp. 21-25.

(Continued)

*Primary Examiner* — Ryan Pitaro
(74) *Attorney, Agent, or Firm* — Morrison & Foerster LLP

(57) ABSTRACT

A user interface having changeable topography is disclosed. The user interface can have a shape changeable surface that can selectively alter according to an input so as to provide changeable topography of the user interface. The surface can include individual nodes that can raise above or lower below the initial surface. Alternatively, the surface can include a shape changeable material that can change the shape of portions thereof into discrete shapes above or below the initial surface. Alternatively, the surface can include a deformable material that can deform portions thereof into discrete forms above or below the initial surface. The changeable topography can define different user interface layouts. The user interface can, for example, be associated with input and/or output devices, such as touch pads, touch screens, and the like.

28 Claims, 32 Drawing Sheets

(56) References Cited

U.S. PATENT DOCUMENTS

| | | |
|---|---|---|
| 6,337,678 B1 | 1/2002 | Fish |
| 6,429,846 B2 | 8/2002 | Rosenberg et al. |
| 6,690,387 B2 | 2/2004 | Zimmerman et al. |
| 6,697,043 B1 | 2/2004 | Shahoian |
| 6,822,635 B2 | 11/2004 | Shahoian et al. |
| 7,009,595 B2* | 3/2006 | Roberts et al. ............... 345/156 |
| 7,015,894 B2 | 3/2006 | Morohoshi |
| 7,018,209 B2* | 3/2006 | Schleppenbach et al. ... 434/114 |
| 7,148,875 B2 | 12/2006 | Rosenberg et al. |
| 7,184,064 B2 | 2/2007 | Zimmerman et al. |
| 7,245,292 B1* | 7/2007 | Custy ........................... 345/173 |
| 7,336,260 B2 | 2/2008 | Martin et al. |
| 7,336,266 B2 | 2/2008 | Hayward et al. |
| 7,339,572 B2 | 3/2008 | Schena |
| 7,663,607 B2 | 2/2010 | Hotelling et al. |
| 7,858,891 B2* | 12/2010 | Strohband et al. ........... 200/406 |
| 8,279,200 B2* | 10/2012 | Kikin-Gil .................... 345/175 |
| 8,456,438 B2* | 6/2013 | Ciesla et al. ................. 345/173 |
| 8,479,122 B2 | 7/2013 | Hotelling et al. |
| 8,581,873 B2* | 11/2013 | Eldering ...................... 345/173 |
| 2005/0110768 A1 | 5/2005 | Marriott et al. |
| 2005/0253816 A1 | 11/2005 | Himberg et al. |
| 2006/0026521 A1 | 2/2006 | Hotelling et al. |
| 2006/0073891 A1* | 4/2006 | Holt ............................... 463/30 |
| 2006/0097991 A1 | 5/2006 | Hotelling et al. |
| 2006/0197753 A1 | 9/2006 | Hotelling |
| 2006/0209037 A1 | 9/2006 | Wang et al. |
| 2007/0024593 A1 | 2/2007 | Schroeder |
| 2007/0152977 A1 | 7/2007 | Ng et al. |
| 2007/0152983 A1 | 7/2007 | McKillop et al. |
| 2007/0236472 A1* | 10/2007 | Bentsen et al. ............... 345/173 |
| 2008/0055255 A1* | 3/2008 | Griffin ......................... 345/173 |
| 2008/0111788 A1 | 5/2008 | Rosenberg et al. |
| 2008/0122797 A1 | 5/2008 | Soh et al. |
| 2008/0150911 A1 | 6/2008 | Harrison |
| 2008/0225012 A1 | 9/2008 | Lipovski |
| 2009/0303175 A1 | 12/2009 | Koivunen |
| 2010/0079264 A1 | 4/2010 | Hoellwarth |
| 2010/0085168 A1* | 4/2010 | Kyung et al. ............. 340/407.1 |
| 2010/0103137 A1* | 4/2010 | Ciesla et al. ................. 345/174 |
| 2010/0174987 A1* | 7/2010 | Shin et al. .................... 715/702 |
| 2010/0270089 A1* | 10/2010 | Kyung et al. ............. 178/18.04 |
| 2011/0007002 A1* | 1/2011 | Tsai et al. ..................... 345/173 |
| 2011/0025602 A1* | 2/2011 | Sivan et al. .................. 345/156 |
| 2011/0102340 A1 | 5/2011 | Martin et al. |
| 2011/0295331 A1* | 12/2011 | Wells et al. ....................... 607/3 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Jan. 4, 2012, for U.S. Appl. No. 12/240,947, filed Sep. 29, 2008, nine pages.

Final Office Action mailed Jul. 27, 2011, for U.S. Appl. No. 12/240,947, filed Sep. 29, 2008, nine pages.

Non-Final Office Action mailed Feb. 23, 2011, for U.S. Appl. No. 12/240,947, filed Sep. 29, 2008, nine pages.

Final Office Action mailed Apr. 11, 2012, for U.S. Appl. No. 12/240,947, filed Sep. 29, 2008, nine pages.

Non-Final Office Action mailed Nov. 24, 2015, for U.S. Appl. No. 12/240,947, filed Sep. 29, 2008, nine pages.

* cited by examiner

USER INTERFACE HAVING CHANGEABLE TOPOGRAPHY

CROSS REFERENCE TO RELATED APPLICATIONS

This application claims priority to U.S. Provisional Patent Application No. 61/140,050, filed Dec. 22, 2008, the contents of which are herein incorporated by reference in their entirety for all purposes.

FIELD OF THE INVENTION

This relates to user interfaces and, more particularly, to user interfaces that can change topography.

BACKGROUND OF THE INVENTION

Many types of input devices are presently available for performing operations in a computing system, such as buttons or keys, mice, trackballs, touch sensor panels, joysticks, touch pads, touch screens and the like. Touch screens and touch pads, in particular, are becoming increasingly popular because of their ease and versatility of operation as well as their declining price. Touch screens can include a touch sensor panel, which can be a clear panel with a touch sensitive surface, and a display device that can be positioned behind the panel so that the touch sensitive surface can substantially cover the viewable area of the display device. Touch screens can allow a user to perform various functions by touching the touch sensor panel using one or more fingers, a stylus or other object at a location dictated by a user interface (UI) comprising virtual buttons, keys, bars, displays, and other elements, being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Similarly, touch pads can include a touch sensor panel having a touch sensitive surface. Touch pads can allow a user to perform various functions by touching the touch sensor panel using one or more fingers, a stylus or other object at a location dictated by a UI comprising a touch space. In general, touch pads can recognize a touch event and the position of the touch event on the touch sensor panel, and the computing system can then interpret the touch event in accordance with the position of the touch event, and thereafter can perform one or more actions based on the touch event.

Touch screens and touch pads can typically have a smooth fixed outer surface through which inputs/outputs can be made. For example, the outer surface can act as an input mechanism that receives touch inputs such as taps, slides and other gestures. With touch screens, the outer surface can further act as a window for displaying text and graphics that change during use. In most cases, the physical surfaces of these devices can be smooth and fixed. In some cases, they can be flat and planar. They generally do not include tactile features like buttons and therefore can be used across many modes, applications or platforms. However, because these surfaces generally do not include tactile features, the user can have a difficult time locating UI elements without looking at the visual screen to ensure that the desired location is touched.

SUMMARY OF THE INVENTION

This relates to a user interface that can physically change topography to create different tactile configurations at the user interface surface. In some embodiments, the user interface can change topography according to a desired user interface state. The user interface state can, for example, be based on a mode of an electronic device in which the user interface is used and/or a particular preference of a user. In some embodiments, the user interface can change topography according to an event, such as a touch event on the user interface surface. The changing topography can define different user interface layouts according to the needs of device.

In some embodiments, the user interface can include a shape changeable surface configured to selectively alter topography of the user interface so as to provide a variable tactile feel of the user interface. The shape changeable surface can include individual nodes that can be raised above or lowered below the initial surface. Alternatively, the shape changeable surface can include shape changeable material that can change shape to form discrete shapes above or below the initial surface. Alternatively, the shape changeable surface can include deformable material that can deform into discrete forms above or below the initial surface.

In some embodiments, the user interface can include shape changeable nodes proximate to the user interface surface and configured to selectively alter so as to alter a proximate region of the surface in order to alter topography of the user interface. The nodes can include electromechanical devices that can move to push against or pull away from the surface. Alternatively, the nodes can include shape changeable elements that can change shape to push against or pull away from the surface. Alternatively, the nodes can include deformable elements that can deform to push against or pull away from the surface.

DETAILED DESCRIPTION OF THE PREFERRED EMBODIMENTS

Figure 1:
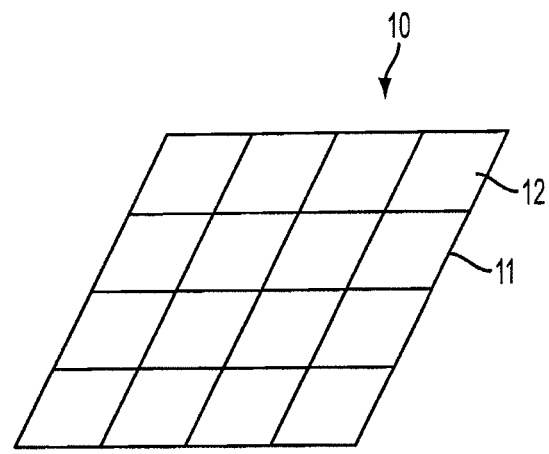
FIG. 1 illustrates an exemplary user interface that can change topography according to embodiments of the invention.

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

This relates to a user interface that can physically change topography to create different tactile configurations at the surface. In some embodiments, the user interface can change topography according to a desired user interface state. The user interface state can, for example, be based on a mode of an electronic device in which the user interface is used and/or a particular preference of a user. In some embodiments, the user interface can change topography according to an event, such as a touch event on the user interface surface. The changing topography can define different user interface layouts. The user interface can, for example, be associated with input and/or output devices, such as touch pads, touch screens, and the like.

The topographical change can be implemented by a shape changeable surface that can include one or more alterable nodes. The nodes can be altered either individually or in combination and be associated with certain user interface elements. For example, the nodes can be altered to define or form a physical or virtual button, a key, a navigation pad, a scroll wheel, and the like. In some embodiments, the nodes can comprise electromechanical devices that can move from one level to another to form raised and lowered regions of the user interface. In some embodiments, the nodes can comprise shape changeable material that can change shape to form raised and lowered regions of the user interface. In some embodiments, the nodes can comprise a deformable membrane that can deform to form raised and lowered regions of the user interface.

This type of configuration can create a different look as well as create a different tactile feel at the user interface surface. In so doing, the user interface can inform the user as to what input and/or output is pertinent for a particular use of an electronic device having the user interface. That is, shape changeable nodes can be moved, shaped, or deformed above or below the initial user interface surface in order to produce a surface of varying topography. When used in conjunction with a display, the shape changeable surface can provide an effective and unobtrusive way to emphasize or highlight certain display elements to the user, and the display can provide a way in which outputs can be viewed by the user. When used in conjunction with a touch sensing device, the shape changeable surface can provide an effective and unobtrusive way for a user to know where the user interface elements are, and the touch sensing device can provide a way in which inputs can be received when the user interface elements are touched. The nodes can correspond directly with a user interface element. For example, the nodes and user interface element can be combined to form an enhanced user interface element. The nodes can also be used indirectly to help define a user interface element. For example, the nodes can help define borders or boundaries of the user interface element.

Although some embodiments of this invention can be described herein in terms of touch sensitive devices with user interfaces, it should be understood that embodiments of this invention are not so limited, but are generally applicable to any devices utilizing other types of sensing technologies with user interfaces.

It should be noted that the terms "activate," "actuate," "stimulate," and the like herein can generally be used synonymously to refer to the shape changeable actions of the user interface to change topography according to embodiments of the invention.

FIG. 1 illustrates an exemplary user interface that can change topography according to embodiments of the invention. In the example of FIG. 1, user interface 10 can include shape changeable surface 11 having shape changeable nodes 12 to change the topography of the user interface. A user interface can be defined as a component associated with a device through which a user interacts with the device to provide input and/or receive output. A topographical (or shape) change can be defined as a change in height, width, length, orientation, configuration, layout, texture, pattern, three-dimensional form, and the like of all or a portion of the surface associated with the user interface. The change can be implemented by physically altering individual shape changeable nodes, as in FIG. 2 described below, or by physically altering a group of shape changeable nodes, as in FIG. 3 described below. The nodes can include an actuator that can change between physical states, thus causing the nodes to change. For example, the actuator can include a moving member that can move the node from an initial state to a raised or lowered state or that can deform, rather than move, the surface in order to create a shape change. In so doing, the topography of the user interface can be selectively changed.

In some embodiments, the user interface 10 can change topography in conjunction with a user interface state, thereby providing different physical layouts of the user interface. For example, the user interface can change its topography to have a certain physical layout when used for a phone mode and can change its topography to have another certain physical layout when used for a media player mode. As should be appreciated, many different physical layouts can be used for any number of modes of a device. In addition, a particular topography can remain static during a particular mode to provide a particular tactile feel. Alternatively, the topography can dynamically change during a particular mode to provide a variety of tactile feels.

In some embodiments, rather than change in conjunction with a user interface state, the user interface 10 can change topography in conjunction with a user input, such as a touch, near touch, or press event. For example, the location proximate to the touch can be altered, in some cases continuously, during a touch event. For example, as a user slides a finger across the surface or presses a finger down on the surface, the node closest to the finger can alter while the remaining nodes do not. This can be implemented with a touch sensing device. For example, a controller can monitor the touch sensing nodes and alter the shape changeable nodes based on the location of the nodes that detect a touch, near touch, or press.

Rows and columns or matrices of shape changeable nodes 12 can cooperate to change topography of a user interface. For example, individual nodes can be altered to create distinct pixel shape changes at the user interface surface. Alternatively, nodes can be altered together to form a larger area or a group of pixel shape changes at the user interface surface.

Various components, e.g., a changeable surface and/or a plurality of changeable parts, can comprise the shape changeable nodes of the user interface according to embodiments of the invention. For example, the surface of the shape changeable nodes can comprise individual nodes that can be altered individually by underlying movable or deformable parts. Alternatively, the surface of the shape changeable nodes can comprise a flexible membrane that can be stretched and retracted at designated node locations by underlying movable or deformable parts. This can keep the nodes hidden from view until they can be activated, for example, if the flexible membrane is substantially opaque. Alternatively, the surface of the shape changeable nodes can comprise a shape changeable membrane that can expand and contract when stimulated by an electrical or magnetic signal or by chemical stimulus.

Movable or deformable parts can underlie the node surface. For example, electromechanical devices, e.g., micro actuators, microelectromechanical devices, or piezoelectronics, can have movable physical components that move up and down when stimulated by a mechanical force or an electrical or magnetic signal, thereby moving the overlying surface. The electromechanical devices can be placed adjacent to individual nodes or to certain locations of the flexible membrane. Alternatively, shape changeable material, e.g., shape memory material, magnetic material, or electrostatic material, can expand or contract when stimulated by an electrical or magnetic signal or chemical stimulus, thereby moving the overlying surface. The shape changeable material can be placed adjacent to individual nodes or to certain locations of the flexible membrane.

The shape changeable nodes will be described in more detail herein later.

Figure 2:
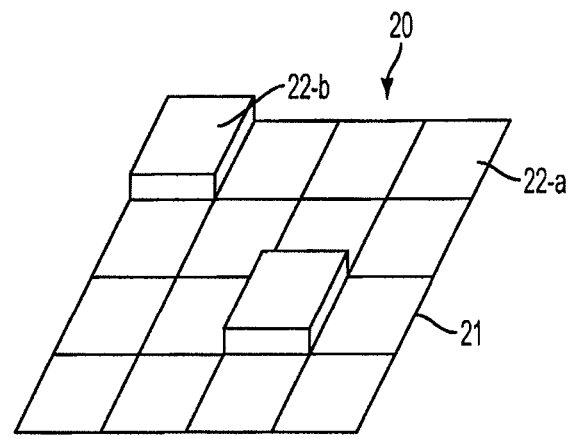
FIG. 2 illustrates an exemplary user interface that can change topography by selectively altering individual shape changeable nodes according to embodiments of the invention.
Figure 3:
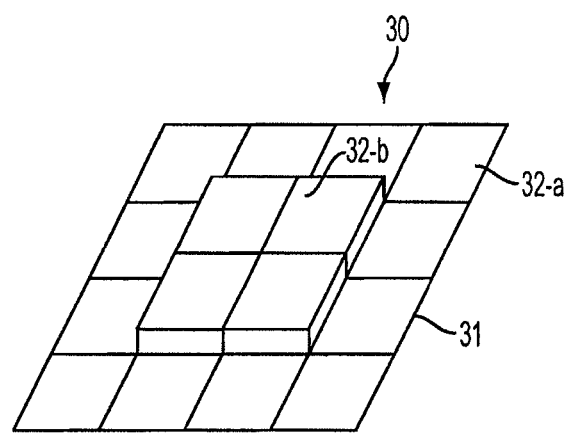
FIG. 3 illustrates an exemplary user interface that can change topography by selectively altering a group of shape changeable nodes according to embodiments of the invention.

In the example of FIG. 2, user interface 20 can include shape changeable surface 21 having shape changeable nodes 22. Shape changeable nodes 22-b can be individually selectively altered to raise regions at the user interface surface 21, while shape changeable nodes 22-a can remain unaltered in the original surface. In the example of FIG. 3, user interface 30 can include shape changeable surface 31 having shape changeable nodes 32. Inner shape changeable nodes 32-b can be collectively selectively altered to raise regions at the user interface surface 31, while outer shape changeable nodes 32-a can remain unaltered in the original surface. In some embodiments, the altered state can be created by a moving element. In some embodiments, the altered state can be created by a deformable element. In some embodiments, the altered state can be created by a shape changeable element. All or portions of the surface can be selectively raised and/or lowered to change topography. In one embodiment, all or a portion of the surface can be raised. In another embodiment, all or a portion of the surface can be lowered. In yet another embodiment, some portions of the surface can be raised while other portions can be lowered. By way of example, individual button(s) can be formed and/or a wheel, e.g., a scroll wheel with an outer scroll ring and a central button, can be formed in the surface by selectively raising and/or lowering different portions of the surface.

Although the shape changeable nodes can be described herein in terms of an orthogonal array of nodes having rows and columns, it should be understood that embodiments of this invention are not limited to orthogonal arrays, but can be generally applicable to nodes arranged in any number of dimensions and orientations, including diagonal, concentric circle, three-dimensional, and random orientations.

Although FIGS. 1 through 3 show the user interface as a planar surface, it is to be understood that the surface can embody various forms, including three-dimensional forms. For example, the initial surface can be contoured to devices having various known shapes, such as a mouse and the like.

It should be further understood that the shape changeable nodes are not limited to rectangles, but can take various forms, such as circles, ovals, irregular shapes, and the like, and sizes and can work together to form different forms and contoured portions at the surface. The shapes can be somewhat dependent on the resolution. The nodes can be associated with points or pixels as well as areas or regions.

A user interface having changeable topography can be associated with a touch sensitive device, such as a touch pad or a touch screen. As such, each shape changeable node of the user interface can be associated with one or more touch sensing nodes of a touch surface of the touch sensitive device. In the case of the touch screen, each shape changeable node can also be associated with one or more display pixels of the touch screen display. The resolution of the shape changeable nodes, the touch sensing nodes, and the display pixels can be the same or different. In some embodiments, the nodes and pixels can have a 1:1:1 relationship in both size and placement. In other embodiments, the relationship can be something other than 1:1:1. For example, it can be such that the resolution of the shape changeable nodes can be large compared to the touch and display pixels, i.e., multiple pixels can be situated within the area of a node. The resolution can be dependent on the desired needs of the device. In some embodiments, the touch sensing nodes can be spaced apart and placed between shape changeable nodes. In some embodiments, the touch sensing nodes can cover the entire surface including portions of the shape changeable nodes.

Figure 4:
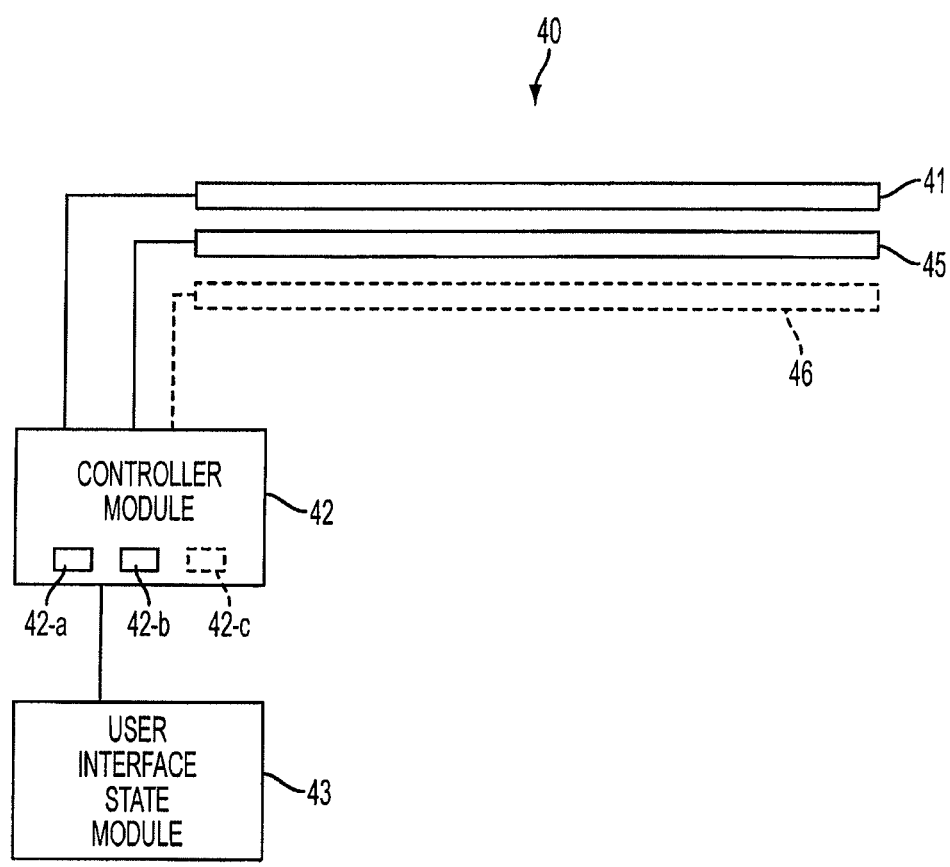
FIG. 4 illustrates an exemplary user interface that can change topography using various modules according to embodiments of the invention.

FIG. 4 illustrates an exemplary user interface that can physically change topography using various modules according to embodiments of the invention. The user interface 40 can for example be associated with the user interfaces 10, 20, 30 shown in FIGS. 1 through 3 respectively. The user interface can be associated with an input/output device that can be operatively coupled to a host device. The host device can for example be an electronic device, such as a portable computer, or a handheld electronic device, such as a phone or media player. Generally speaking, the user interface can be applied to a consumer electronic product that includes a user interface. In some cases the user interface can be peripherally operable relative to the host, while in other cases the user interface can be integrated within the host. The user interface can be particularly useful in portable devices and further handheld devices that can have limited real estate for placement of a user interface. By way of example, the user interface can be integrated within a touch screen of an iPhone™ or touch pad of an iPod™ manufactured by Apple Inc. of Cupertino, Calif.

In the example of FIG. 4, the user interface 40 can include shape changeable layer 41 to change topography of the user interface. The shape changeable layer 41 can for example include a matrix of nodes, each of which can be capable of physically changing a specific location of the user interface in order to change the topography of the surface. For example, each shape changeable node can be configured to raise or lower the surface of the user interface, thereby changing the topography. This can be done in with multiple nodes in combination or with discrete single nodes. That is, the nodes can be controlled in a variety of ways to produce the desired topography, i.e., different shapes, contours, forms.

The user interface 40 can also include sensing layer 45 to detect a touch or near touch (proximity). Like the shape changeable layer, the sensing layer can include a matrix of nodes. The sensing nodes can be configured to detect the presence of an object such as a finger. The sensing layer 45 can be widely varied. In one example, the sensing layer 45 can be based on capacitance. It should be appreciated that other technologies including resistive, surface wave, pressure sensing and the like can be used. In some cases, the sensing layer 45 can even be multipoint sensing, i.e., capable of sensing multiple objects at the same time (simultaneously). In one example, the sensing layer 45 can be associated with touch sensing (or near touch/proximity). The sensing nodes can be configured to cooperate with the shape changeable nodes to change the topography and sensing areas of the user interface. For example, while the shape changeable nodes can alter the shape of the user interface, the sensing nodes can alter the detectable areas of the user interface. In one example, the sensing nodes can be activated or deactivated and the shape changeable nodes can be adjusted based on the desired user interface.

The user interface 40 can also optionally include display layer 46 to display user interface elements as for example when the user interface 40 is associated with a touch screen. The display layer 46 can be configured to display graphics and text. The display layer 46 can be a single display or a group of displays that work together. When discrete, the displays can work with the shape changeable nodes to change the topography of the user interface. For example, the displays can raise or lower. In some cases, the display layer 46 can be unassociated from a touch screen and can work with shape changeable nodes independent of a touch sensor. For example, the display layer can change its topography based on what is being displayed to create a three-dimensional display effect.

The display layer can also be associated with a touch pad having a visual feedback elements as disclosed in U.S. patent application Ser. No. 11/394,493, entitled "Illuminated Touchpad," and Ser. No. 11/591,752, entitled "Touch Pad with Symbols Based on Mode," the contents of which are incorporated herein by reference in their entirety for all purposes.

The user interface 40 can also include controller module 42 for controlling the various layers of the user interface. The controller 42 can be, for example, a dedicated processor or a supplemental processor. The controller 42 can even be a part of the host device in some circumstances. The controller 42 can be in the form of an application specific integrated circuit (ASIC). In some cases, the controller 42 can include modules as for example shape module 42-*a* to control topographical changes, touch module 42-*b* to control touch detection, and optionally display module 42-*c* to control displays. The modules can be discrete or integrated, depending on the needs of the user interface.

In some cases, the user interface 40 can also include user interface state module 43 that can drive the user interface to change topography, display and/or sensing based on a desired user interface state. The user interface state module 43 can be part of the user interface 40 or separate. For example, the user interface state module can be associated with the host device. The module 43 can be, for example, software, firmware, or hardware. At various times, the controller 42 can drive the user interface to change topography. It is to be understood that other and/or additional components can comprise the user interface according to the needs of the user interface.

During operation, the controller 42 can be configured to control the various layers 41, 45, 46 in order to produce the desired user interface effect. For example, the shape changeable layer 41 can be controlled to produce a desired topography or to change the tactile feel of the user interface during use. In addition, the controller 42 can activate and deactivate touch regions. For example, the controller 42 can produce active regions that detect touches and null regions that ignore touches. In addition, the controller 42 can direct the display layer 46 to display user interface elements. For example, the controller 42 can instruct the display layer 46 to display virtual buttons or the like. It should be appreciated that the shape points or regions, touch points or regions and display points or regions can be controlled together to produce the desired user interface effect. In one embodiment, these elements can be associated with one another. For example, the display can display a virtual button, the touch sensor can be active at the virtual button, and the shape change can create boundaries around the virtual button or raise and/or lower the virtual button itself. The user can therefore feel and see the button and touch it to activate an input.

In some embodiments, the controller 42 can adjust each of the layers 41, 45, 46 in order to produce layouts based on applications or modes, which can be associated with the host. For example, the user interface state module 43 can drive the user interface to change to a phone mode or a media player mode.

In other embodiments, the controller 42 can adjust the layers 41, 45, 46 based on how a user interacts with the user interface. For example, after detecting a touch event, the shape changeable nodes associated with the touch event can change shape in order to provide feedback to the user as the user interacts with the user interface. For example, the surface can change in real time during the touch event. The change can be based on touch location, acceleration, direction, size, number of touch points and/or the like. Basically, any characteristic of the touch event can affect the topography.

It should be appreciated that the layers 41, 45, 46 can be placed in various layer stacks and, in some cases, integrated into the same layer stack, depending on the needs of the device. For example, the layers 41, 45, 46 can be ordered differently from top to bottom. In one example, the shape changeable layer can be disposed above the sensing and display layers. In another example, the sensing layer can be position above the shape changeable layer. Alternatively, the sensing layer and shape changeable layer can be integrated into the same layer. In another example, the shape changeable layer can be disposed below the display and touch sensing layer. In yet another example, all the layers can be integrated. In yet another example, the display and sensing can be integrated into the same layer.

Figure 5:
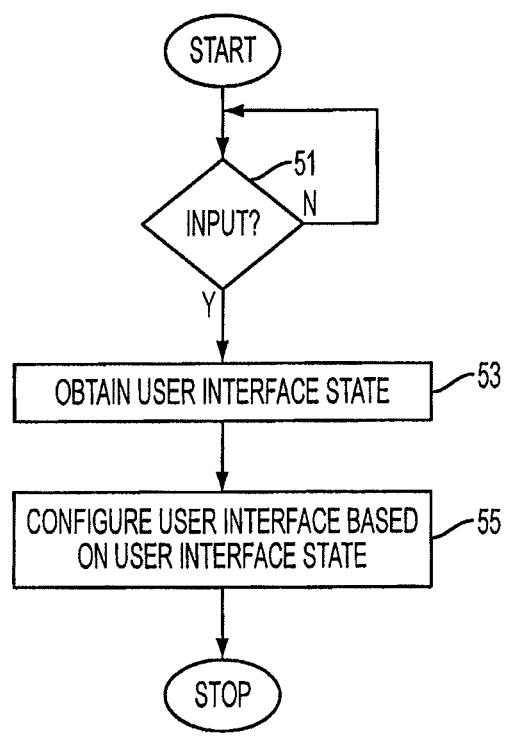
FIG. 5 illustrates an exemplary method for changing the topography of a user interface according to embodiments of the invention.

FIG. 5 illustrates an exemplary method for changing a topography of a user interface according to embodiments of the invention. In the example of FIG. 5, a determination can be made about whether an input has been received (51). The input can be from a user of a touch sensitive device. For example, the user can input a request to form a particular user interface or can touch or near touch the user interface surface. The input can also be from an application running on the device. For example, a telephone application running on the device can input a command to form a telephone user interface. The input can also be from the device itself. For example, upon powering up, a device can input a command to form a user interface for that particular device type.

Based on the input, a user interface state can be obtained (53). The user interface can be configured based on the obtained user interface state (55). The configuring can include at least a physical change of the user interface. The user interface can be in communication with the host system or device, which can drive the configuring. Alternatively, the user interface can frequently ask for a new configuration.

The configuring can include configuring the topography of the user interface according to the user interface state. For example, the shape or contour of the user interface can be adjusted to match preferences for the user interface state, where the control shape module can map the contour to the user interface state, thereby creating variable, different tactile feels. The configuring can also include configuring touch characteristics of the user interface according to the user interface state. For example, the null touch areas and the active touch areas can be configured and associated with the shape and contour of the user interface. The configuring can also include configuring display characteristics of the user interface according to the user interface state. For example, user interface elements can be displayed that are associated with the shape and contour of the user interface.

The configuring can also include configuring the topography of the user interface dynamically. For example, the shape or contour of the user interface can be adjusted based on a touch event, thereby dynamically creating different tactile feels and feedback.

The regions on the device surface to form the user interface can be determined in a number of ways. For example, a look-up table residing in memory can store, for each user interface state, the list of regions and/or nodes to be altered to form the user interface. When a user interface state is obtained, the list of regions and/or nodes can be retrieved from the look-up table.

It is to be understood that the method is not limited to that illustrated here, but can include additional or other functions for changing the topography of a user interface according to embodiments of the invention.

Figure 6:
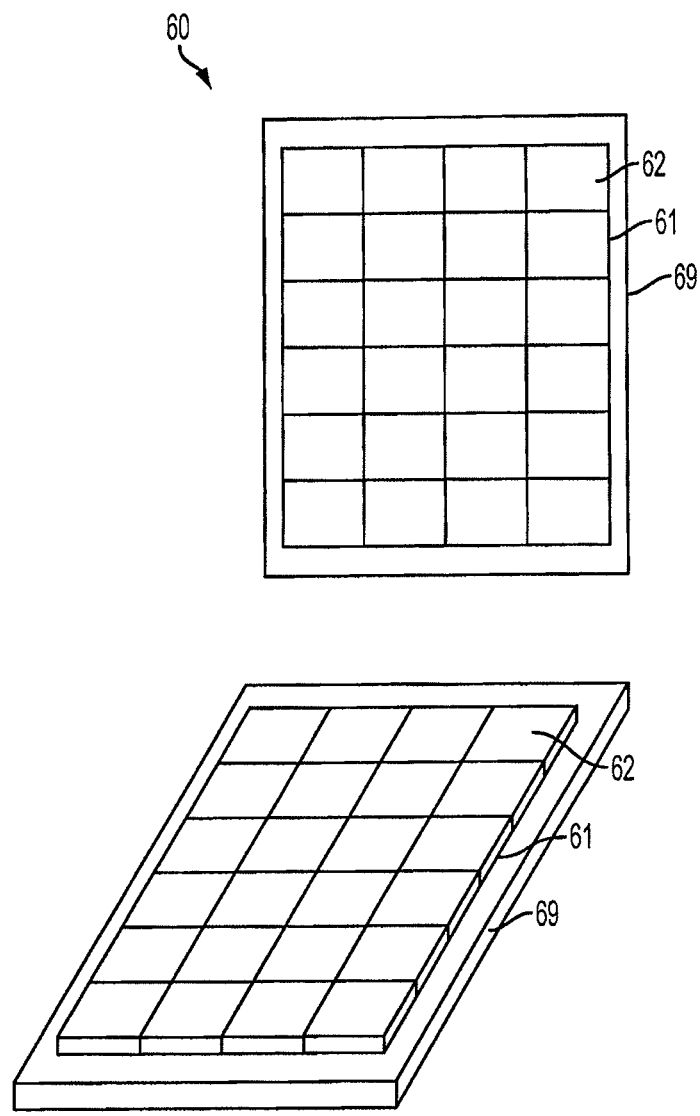
FIG. 6 illustrates an exemplary touch screen having a user interface that can change topography according to embodiments of the invention.

FIG. 6 illustrates an exemplary touch screen that can change topography according to embodiments of the invention. As shown in FIG. 6, touch screen 60 can include shape changeable surface 61 having a plurality of movable touch screen blocks 62. In some cases, the touch screen blocks 62 can be proximate to one another and more particularly adjacent to one another. They can be positioned together to form a user interface having a wide variety of shapes (e.g., square, rectangle, circle, plus, cross, X, concentric, annular, etc.). They can for example be positioned in rows and/or columns in order to form a substantially rectangular user interface (as shown). Each of the touch screen blocks 62 can include a display and touch sensor(s). The touch screen blocks 62 can work individually or be configured to cooperate with one another to form one large touch screen display.

The movement of the touch screen blocks 62 can be widely varied. In one embodiment, the touch screen blocks 62 can be configured to move up and down from a nominal position. The nominal position of the blocks 62 can form a tapered, curved or flat surface. In the illustrated embodiment, the nominal position of the blocks 62 can form a substantially flat planar surface. That is, each of the touch screen blocks can include a flat planar surface, the upper surface of which can be level with the other blocks when in the nominal position. Depending on the desired needs of the device, the touch screen blocks can raise, lower and/or remain in the nominal position in order to affect a topography change at the surface 61. This can be accomplished while adjusting the display elements being presented and the touch sensors being active on the touch screen blocks 62. The movement can be analog or binary. In analog, the movement can occur at various distances of up and down, while in binary, the movement can be up and down at a specific distance.

The touch screen blocks 62 can respond to a user's input and/or be changed by a host system for example in response to a control signal or mode of the host system. In some embodiments, the placement of the touch screen blocks can be configured to form specific user interface elements, as in FIGS. 7 and 8 described below.

Figure 7:
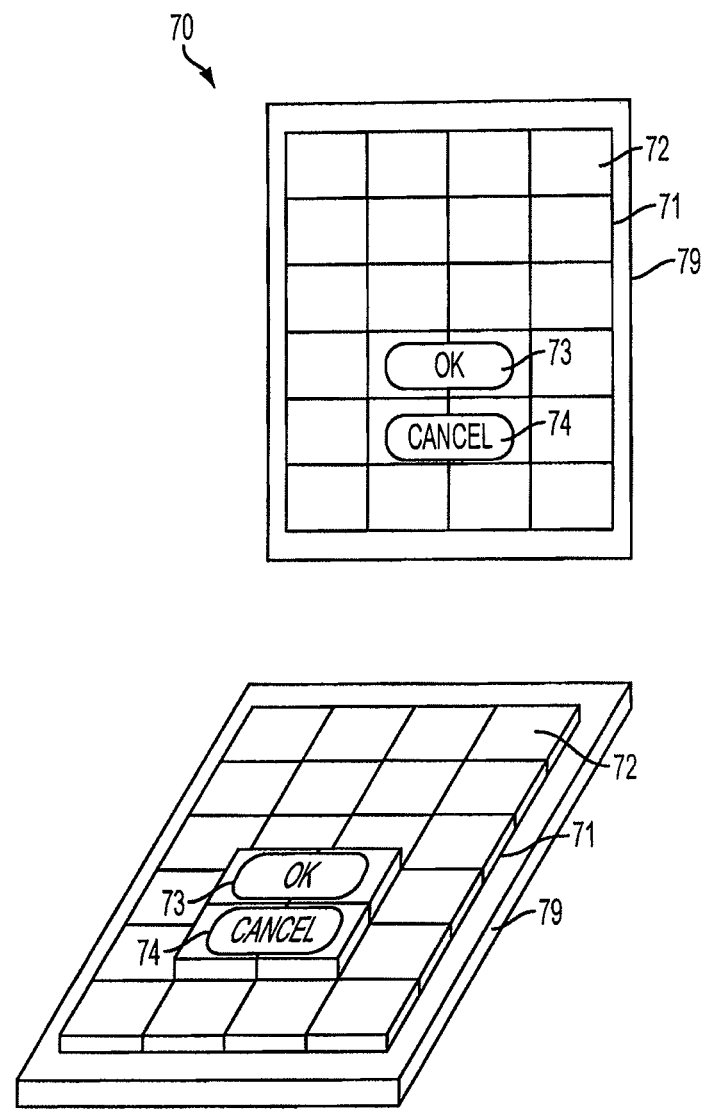
FIG. 7 illustrates an exemplary touch screen having a user interface that can change topography to form virtual buttons according to embodiments of the invention.

FIG. 7 illustrates an exemplary touch screen having a user interface that can change topography to form virtual buttons according to embodiments of the invention. In the example of FIG. 7, touch screen 70 can have a desired user interface state in which the user interface can display two virtual buttons 73 and 74 in the display 79. As such, shape changeable nodes 72 overlaying the displayed buttons 73 and 74 can be raised on the surface 71, thereby informing the user of the location of the buttons to be touched. The underlying display 79 can display "OK" and "Cancel" user interface elements in the display regions corresponding to the raised nodes. A computing system can have functions associated with these displayed elements that can execute when the user touches the buttons 73 and 74.

Figure 8:
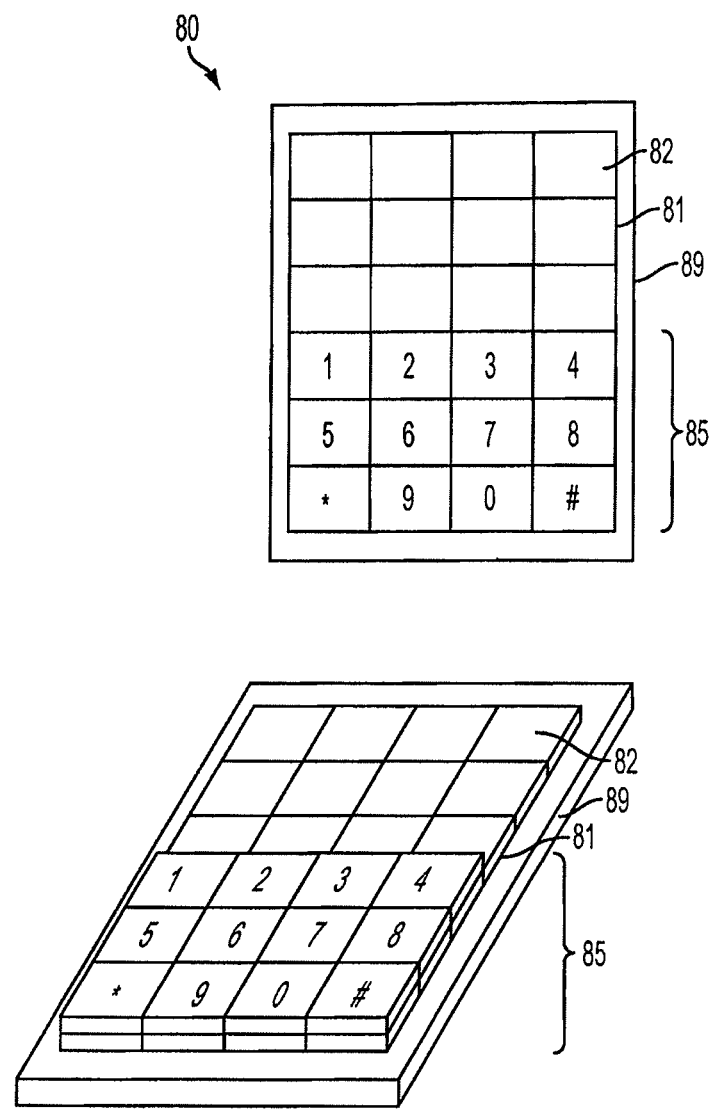
FIG. 8 illustrates an exemplary touch screen having a user interface that can change topography to form a virtual keypad according to embodiments of the invention.

FIG. 8 illustrates an exemplary touch screen having a user interface that can change topography to form a virtual keypad according to embodiments of the invention. In the example of FIG. 8, touch screen 80 can have a desired user interface state in which the user interface can display virtual keypad 85 in the display 89. As such, shape changeable nodes 82 overlaying the displayed keypad 85 can be raised on the surface 81, thereby informing the user of the locations of the keys in the keypad to be touched. The underlying display 89 can display the numbers and symbols of the keypad in the display regions corresponding to the raised nodes. A computing system can have functions associated with these displayed numbers and symbols that can execute when the user touches the keypad 85.

In the examples of FIGS. 6 through 8, the touch screen blocks can be raised or lowered by individual underlying movable or deformable parts. For example, each touch screen block can include an individual actuator dedicated thereto. Alternatively, a flexible membrane or the shape changeable membrane with discrete point control can also be used instead of the individual actuators. The membrane can be placed below the touch screen blocks to encourage their movement or alternatively above the touch screen blocks to replace their movement. If the latter, the nodes and membranes can be substantially transparent or semi transparent so as to see the underlying touch displays.

Certain nodes of the user interface can raise above or lower below the initial surface, some can remain at their previous state above or below the initial surface, some can return to the initial surface, and some can remain unaltered in the initial surface, depending on the requirements for the user interface state. The user interface surface can be flat, as illustrated here, curved, or any other suitable shape capable of changing topography to provide a user interface.

It is to be understood that the shape changeable user interface is not limited to the user interface states illustrated here, but can include any state that can provide a user interface. In some instances, multiple user interface states can be combined.

Furthermore, although not shown, it should be appreciated that a transparent flexible membrane can overlay the touch screen blocks. When moved, the membrane can simply stretch to accommodate the new position of the touch screen blocks.

Figure 9:
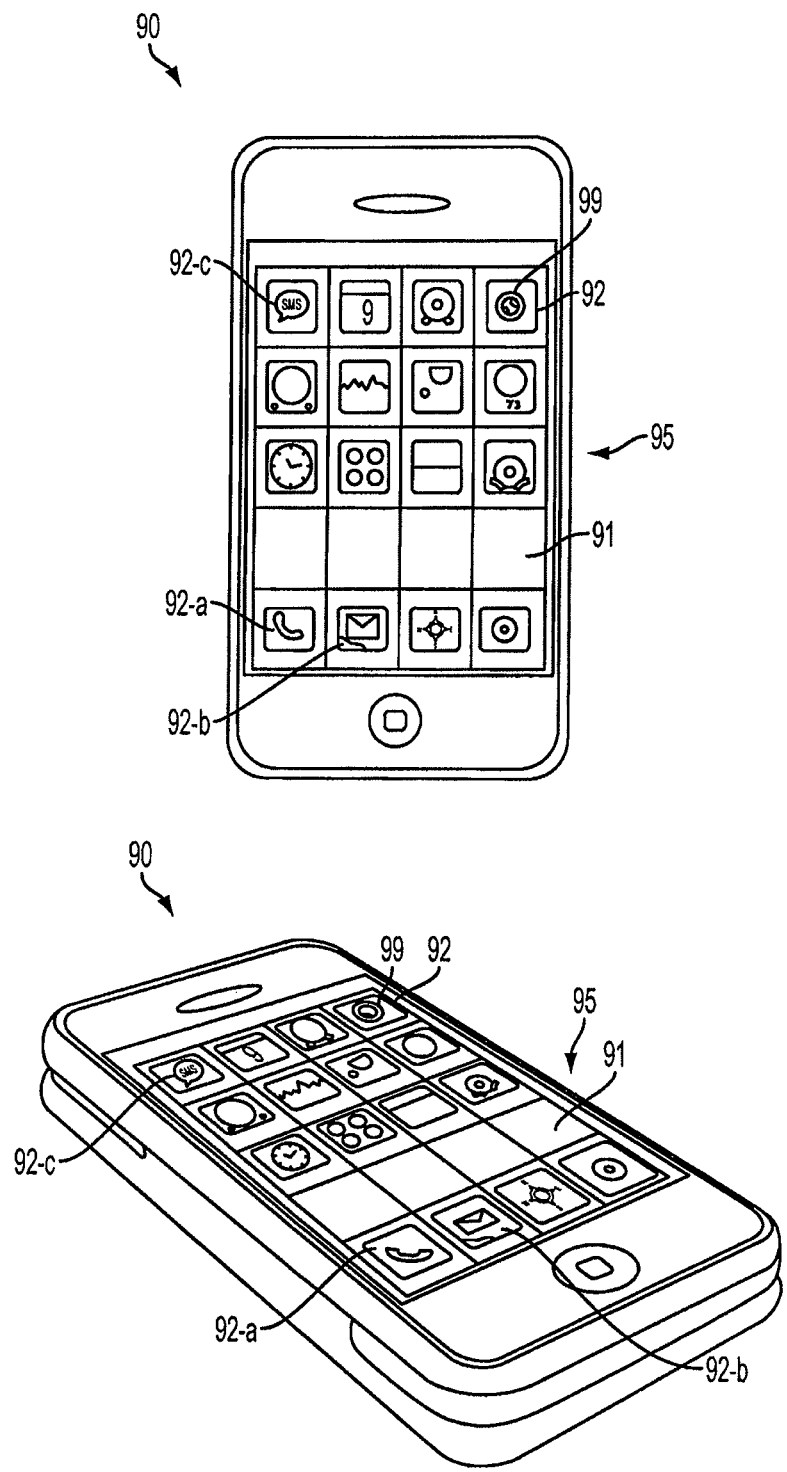
FIG. 9 illustrates an exemplary touch screen of an electronic device having a user interface that can change topography according to embodiments of the invention.

Similar to the examples of FIGS. 6 through 8, FIG. 9 illustrates an exemplary touch screen of an electronic device having a user interface that can change topography according to embodiments of the invention. In the example of FIG. 9, electronic device 90 can include touch screen 95, which can include shape changeable surface 91 having a plurality of movable touch screen blocks 92. In this example, the touch screen blocks 92 can be sized similarly to a displayed icon 99. That is, the icons 99 can coincide with the touch screen blocks 92 so as to provide the ability to physically alter a particular icon displayed in the touch screen block 92. A computing system can have functions associated with these icons that can execute when the user touches the icon 99. By way of example, the touch screen 95 can be implemented in an iPhone™ manufactured by Apple. Inc of Cupertino, Calif. In this example, there can exist a matrix of rows and columns that can substantially coincide with the main page or menu page of the iPhone™. The touch screen can for example be broken into 4 columns and 5 rows. As shown, the icons 99 and their descriptors can substantially fill each of the movable touch screen blocks 92. The blocks 92 can for example move up and/or down depending on the needs of the iPhone™ and user. In one example, when a user receives an incoming call, the block 92-a associated with the phone icon can raise up. The same thing can happen with emails in block 92-b or SMS messages in block 92-c. The blocks can also raise up in accordance with a user touch. For example, as the user moves a finger around the touch screen, the block that would activate upon lift of finger can raise up, thereby alerting the user as to which icon is selectable for given touch point. It should be appreciated, that it is not limited to main page and can be used in all screens of the iPhone™ depending on needs of iPhone™ and user.

As mentioned previously, the touch screen blocks 92 can be raised or lowered by underlying movable or deformable parts. The blocks 92 of the user interface can raise above or lower below the initial surface, some can remain at their previous state above or below the initial surface, some can return to the initial surface, and some can remain unaltered in the initial surface, depending on the requirements for the user interface state. The nominal user interface surface can be flat, as illustrated here, curved, or any other suitable shape capable of changing topography to provide a user interface.

The example shown in FIG. 9 can work particularly well with graphical user interfaces that provide a plurality of spaced apart selectable icons oriented in a manner similar to the touch screen blocks 92 (e.g., matrix or rows and columns). Each of the spaced apart icons can be displayed in a separate touch screen block 92. The maximum number of icons that can be displayed can coincide with the total number of touch screen blocks 62. Of course, the number of icons displayed can be less than the maximum as shown in FIG. 9. The number of icons and number of touch screen blocks can generally depend on the needs of the device.

It is to be understood that the shape changeable user interface is not limited to the user interface states illustrated here, but can include any state that can provide a user interface. In some instances, multiple user interface states can be combined.

Figure 10:
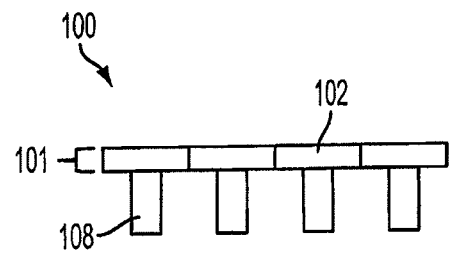
FIG. 10 illustrates an exemplary user interface that can change topography using electromechanical devices according to embodiments of the invention.

FIG. 10 illustrates a side view of an exemplary user interface that can change topography using electromechanical devices according to embodiments of the invention. In the example of FIG. 10, user interface 100 can include dynamic shape changeable surface 101 having individual shape changeable nodes 108. In some embodiments, the dynamic surface 101, and more particularly each of the nodes 108 can be made up of individual selectable, alterable portions 102 that can receive a touch on a front side. The individual alterable portions 102 can be configured to change their position or their physical configuration in order to affect a topography change at the dynamic surface 101.

The individual alterable portions 102 can be widely varied. The individual alterable portions can include at least a sensing layer. The sensing layer can for example be configured to detect the presence of an object in close proximity thereto and further whether an object is touching. The sensing layer can for example be a touch sensing layer, although it should be appreciated that this is not a limitation and that other types of sensors can be used. Additionally or alternatively, the alterable portions can include a display element. The display element can for example be a display panel. Examples of display elements can include LCD, OLED, electronic ink, and the like. The individual alterable portions can include additional elements including for example covers, labels, skins and the like.

In one example, the change in the alterable portions 102 can be driven by shape changeable actuators that form the shape changeable nodes 108.

Figure 14:
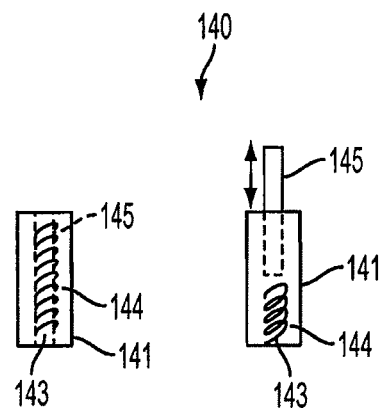
FIG. 14 illustrates an exemplary electromechanical device that can be used for changing topography of a user interface according to embodiments of the invention.

FIG. 14 illustrates an exemplary electromechanical device that can be used as a shape changeable actuator for changing topography of a user interface according to embodiments of the invention. In the example of FIG. 14, actuator 140 (or electromechanical device) can have housing 144 having outer surface 141, movable piston 145 within the housing, and solenoid 143 surrounding the piston that can be electrically stimulated to actuate the piston. In an unactuated state, the piston 145 can be partially or fully seated within the housing 144. Whereas in an actuated state, the piston 145 can move out of the housing 144 to push against the corresponding alterable portion 102 of the node 108 of FIG. 10. Conversely, in an unactuated state, the piston 145 can be partially or fully moved out of the housing 144. Whereas in an actuated state, the piston 145 can move into the housing 144 to pull away from the corresponding alterable portion 102 of the node 108 of FIG. 10. Alternatively, in an unactuated state, the piston 145 can be seated midway within the housing 144. Whereas, in an actuated state, the piston 145 can move further out of the housing 144 to push against the corresponding alterable portion 102 of the node 108 of FIG. 10 and can move further into the housing to pull away from the corresponding alterable portion of the node. The amount that the piston 145 moves into and out of the housing 144 can be controlled by the amount of stimulus, e.g., electrical current, applied to the solenoid 143, according to the user interface state.

Referring again to FIG. 10, the shape changeable actuators 140 of FIG. 14 can be disposed on a back side opposite the front side of the alterable portions 102. In some cases, the alterable portions 102 can be disposed adjacent to the back side of the surface 101, where each actuator 140 can be proximate to a particular alterable portion 102 of the surface. In some embodiments, the actuators 140 can be electromechanical devices (symbolically illustrated by the rectangles in FIG. 10 and described in FIG. 14), such as micro actuators, microelectromechanical (MEM) devices, piezo-electronics, and other suitable such miniature devices and can have various gears, cams, and other electromechanical devices to help actuate the alterable portions 102.

In one example, the actuators 140 can have a housing, a movable piston within the housing, and a solenoid surrounding the piston. When an electrical current passes through the solenoid, the solenoid can produce a magnetic field that moves the piston in and out of the housing. The movement of the piston can for example be used to affect a change of the alterable portion 102.

In some embodiments, each alterable portion 102 can raise above the initial surface 101 when the corresponding actuator 140 changes to push against the back side of the portion and can lower below the initial surface when the actuator changes to pull away from the back side of the portion. In some embodiments, where the actuators 140 have "push against" change, each alterable surface portion 102 can raise above the initial surface 101 when the corresponding actuator 140 pushes against the back side of the portion and otherwise remain unaltered in the initial surface. In some embodiments, where the actuators 140 have "pull away" change, each alterable surface portion 102 can lower below the initial surface 101 when the corresponding actuator 140 pulls away from the back side of the portion and otherwise remain unaltered in the initial surface.

In some embodiments (as shown), the alterable portions 102 of the surface 101 can be configured to form a matrix of rows and columns. It is to be understood, however, that the surface configuration is not so limited, but can include other suitable configurations. Similarly, in some embodiments (as shown), the actuators 140 can be configured to form a matrix of rows and columns corresponding to the matrix rows and columns of the surface's alterable portions 102. It is to be understood, however, that the changeable nodes' configuration is not so limited, but can include other suitable configurations, including other resolutions.

In some embodiments, the actuators 140 can additionally carry input signals between the surface 101 and other components of the user interface 100. For example, the actuators 140 can carry touch signals from the surface 101 to the device processor to be processed and can carry display signals from the processor to the surface for display.

The outer side of the alterable portions can be widely varied. They can be rigid or flexible and in some cases even deformable. They can also be angled, flat or have a curved shape. In general, the outer sides of each alterable portion can cooperate with the other alterable portions to form a continuous outer side. This continuous outer side can be angled, flat or curved.

Figure 11:
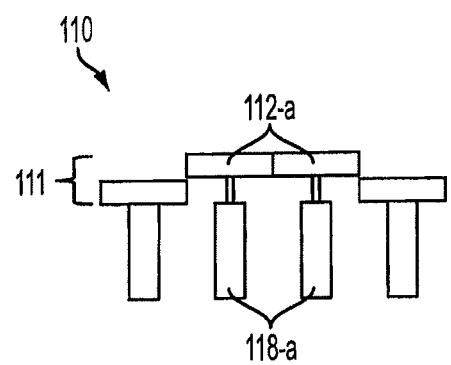
FIG. 11 illustrates an exemplary user interface that can change topography using electromechanical devices to raise portions of the user interface surface according to embodiments of the invention.

FIG. 11 illustrates an exemplary user interface that can change topography using electromechanical devices to raise portions of the user interface surface according to embodiments of the invention. In the example of FIG. 11, user interface 110 can include dynamic shape changeable surface 111 having individual shape changeable nodes 118. In some embodiments, the dynamic surface 111, and more particularly each of the nodes 118 can be made up of individual selectable, alterable portions 112 that can receive a touch on a front side. The individual alterable portions 112 can be configured to change their position or their physical configuration in order to affect a topography change at the dynamic surface 111. In one example, the change in the alterable portions 112 can be driven by shape changeable actuators that form the shape changeable nodes 118. Shape changeable actuators 140 (which can be electromechanical devices) of FIG. 14 can be capable of moving the alterable portions 112 between an unactuated state and an actuated state. The actuated state can for example include raising and lowering of the alterable portion 112. The motion can be analog or binary. In analog, varying heights can be achieved. In binary, the motion can be simply up or down a predetermined distance.

Figure 12:
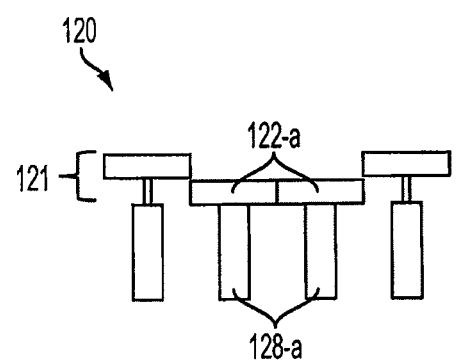
FIG. 12 illustrates an exemplary user interface that can change topography using electromechanical devices to lower portions of the user interface surface according to embodiments of the invention.

FIG. 12 illustrates an exemplary user interface that can change topography using electromechanical devices to lower portions of the user interface surface according to embodiments of the invention. In the example of FIG. 12, user interface 120 can include dynamic shape changeable surface 121 having individual shape changeable nodes 128. In some embodiments, the dynamic surface 121, and more particularly each of the nodes 128 can be made up of individual selectable, alterable portions 122 that can receive a touch on a front side. The individual alterable portions 122 can be configured to change their position or their physical configuration in order to affect a topography change at the dynamic surface 121. In one example, the change in the alterable portions 122 can be driven by shape changeable actuators that form the shape changeable nodes 128. Shape changeable actuators 140 (which can be electromechanical devices) of FIG. 14 can be capable of moving the alterable portions 122 between an unactuated state and an actuated state. The actuated state can for example include raising and lowering of the alterable portion 122. The motion can be analog or binary. In analog, varying heights can be achieved. In binary, the motion can be simply up or down a predetermined distance.

In a specific example of FIGS. 11 and 12, the actuators 140 of FIG. 14 can generally correspond to a solenoid. The solenoid can for example include a moving piston that can be coupled to the alterable portions. In the example of FIG. 11, the nodes 118 can have an unactuated state in which their pistons can be fully seated in their housings. In addition, the nodes 118-*a* can be actuated such that the piston pushes against their corresponding portions 112-*a* of the surface 111 and raise the corresponding portions above the initial surface. The other portions of the surface 111 can remain unaltered in the initial surface when their corresponding nodes 118 are not actuated. In the example of FIG. 12, changeable nodes 128 can have an unactuated state in which their pistons can be partially moved out of their housings to form the initial surface above the housings. The nodes 128-*a* can be actuated such that the pistons can pull away from their corresponding portions 122-*a* of the surface 121 and lower the corresponding portions below the initial surface, where the other portions corresponding to unactuated nodes can remain unaltered in the initial surface. Of course, the examples shown in FIGS. 11 and 12 can be combined such that some of the portions can be raised, some of the portions can be lowered and some of the portions can remain unchanged. It should also be appreciated that any number of the portions can remain unchanged or changed depending on the needs of the system. That is, the example is not limited to moving pairs of adjacent portions as shown.

In one embodiment, the lower side of the alterable portions can be limited to raising no higher than the upper side of an adjacent portion so as to prevent gaps from forming therebetween. This can for example be controlled in software. Furthermore, in some cases, the interface between adjacent portions can include an elastic seal which can allow movement therebetween while preventing a gap from forming. In one example, the under side of the portions can include a single seal layer that can cover the entire surface (excluding the attachment points) and therefore the interfaces.

In the examples of FIGS. 10 through 12, the nodes 108, 118, 128, respectively, can be proximate to their corresponding dynamic surfaces 101, 111, 121 that can be raised or lowered by the underlying nodes. The dynamic surfaces can be replaced with a flexible membrane or a shape changeable membrane proximate to the nodes. Alternatively, both the nodes and the dynamic surfaces can be replaced with the shape changeable membrane that itself can change shape to alter the user interface.

In some embodiments, the dynamic surface can be fixed to unchangeable nodes to prevent either upward or downward altering in those areas. For example, some nodes can be unchanged and can have the surface fixed to these nodes to prevent altering. Unchangeable nodes can be interspersed with changeable nodes, depending on the needs of the system.

Figure 13:
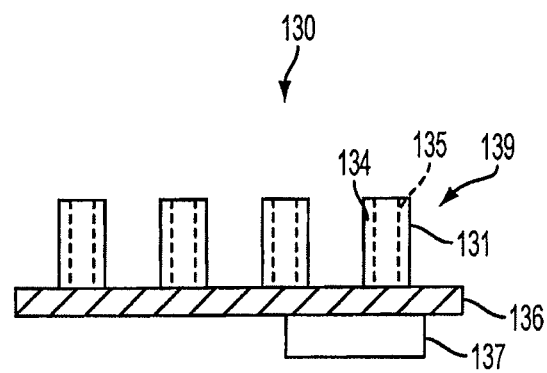
FIG. 13 illustrates an exemplary circuit for changing topography of a user interface using electromechanical devices according to embodiments of the invention.

FIG. 13 illustrates an exemplary circuit for changing the user interface topography using electromechanical devices according to embodiments of the invention. The circuit can for example generally be applied to the mechanism shown in FIGS. 10 through 12. The circuit 130 can include application specific integrated circuit (ASIC) 137 that can be operatively coupled to printed circuit board (PCB) 136 that can be operatively coupled to a plurality of the changeable nodes (or actuators) 108, 118, 120 of FIGS. 10 through 12, respectively. In FIG. 13, the PCB 136 and/or the ASIC 137 can cause a stimulus, e.g., an electrical current, to be applied to the nodes 139. The nodes 139 can include housing 134, movable piston 135, and a solenoid that can be actuated by the stimulus to move the piston out of the housing. The pistons 135 of the unstimulated nodes 139 can remain stationary. The connections between the PCB 136 and/or ASIC 137 and the nodes 139 can have, for example, individual switches for each node, where a particular node's switch can close when the node is selected to be actuated so as to transmit the stimulus and can remain open when not. The PCB 136 and the ASIC 137 can include one or more processors and memory for executing software and/or firmware to change the topography of the user interface according to embodiments of the invention.

In some embodiments, the user interface can be incorporated into a touch sensitive device. It is to be understood, however, that the user interface can be incorporated into any device capable of changing the topography of the user interface.

Figure 15:
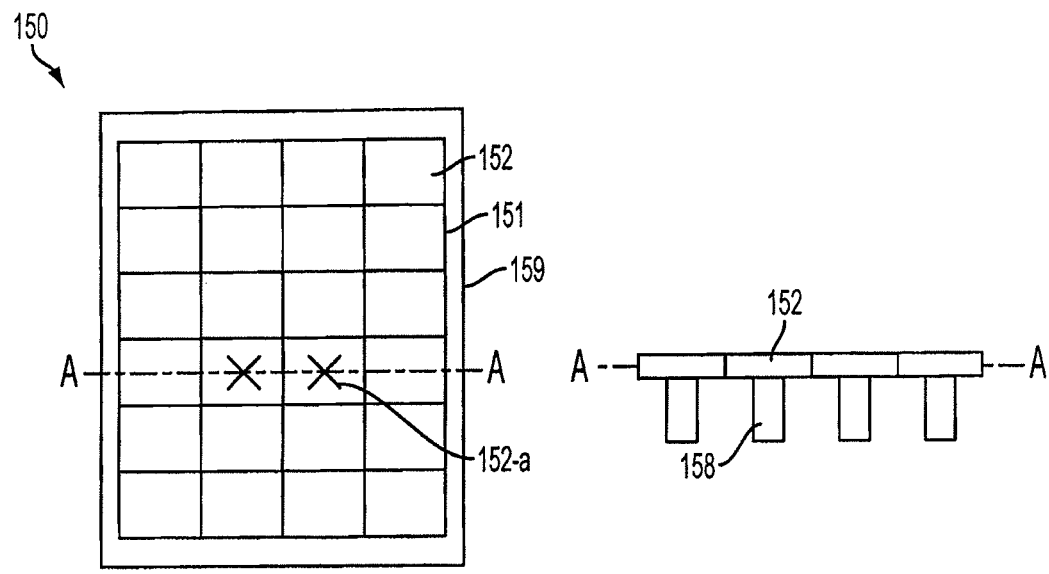
FIG. 15 illustrates an exemplary user interface of a touch screen that can change topography according to embodiments of the invention.

FIG. 15 illustrates an exemplary user interface of a touch screen that can change topography according to embodiments of the invention. This embodiment can generally correspond to the embodiment shown in FIGS. 10 through 12. In the example of FIG. 15, touch screen 150 can have nodes 158 that can change the topography of the touch screen surface 151. The nodes 158 can for example include alterable portions 152, which can include a touch sensing layer and a display layer. The alterable portions 152 can be configured to raise and lower via an actuator, e.g., an electromechanical device, forming the nodes 158. The actuators can raise or lower the portions 152 in order to form raised and/or lower regions of the surface. These regions can correspond to a virtual button, e.g., an "OK" button being displayed on the touch screen. As such, the user can be provided a physical way for identifying the location of the virtual button, and more particularly the region for activating the virtual button. For example, the user can identify the boundary by feeling a raised or lowered edge. As shown, portions 152-*a* and corresponding nodes 158 can be located where the virtual button could be (symbolically illustrated by "X" in the figure). A cross section at line A-A shows the nodes 158 and the surface portions 152 in the touch screen.

Figure 16:
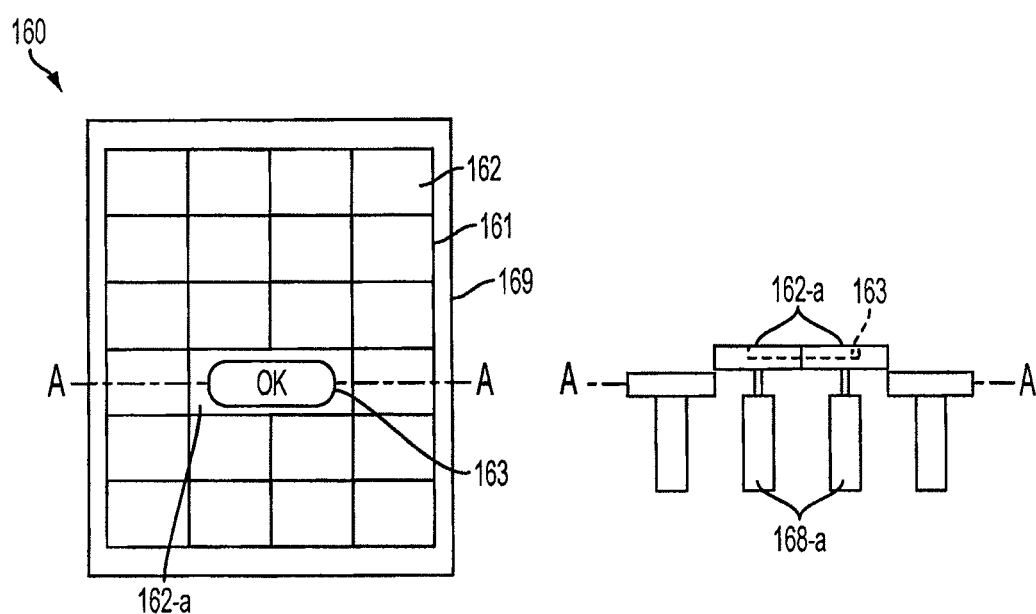
FIG. 16 illustrates an exemplary user interface of a touch screen that can change topography to form a virtual button according to embodiments of the invention.

FIG. 16 illustrates an exemplary user interface of a touch screen that can change topography to form a virtual button according to embodiments of the invention. In the example of FIG. 16, touch screen 160 can form virtual push button 163. The cross section at line A-A shows nodes 168-*a* that can raise alterable portions 162-*a* of user interface surface 161, thereby forming the push button and informing the user of the location of the push button to be touched. Display nodes (coinciding with nodes 162) can display the user interface element "OK" to indicate the push button's function. In some cases, the actuators, e.g., electromechanical devices, forming the nodes 168-*a* can be configured to provide feedback during a push button event. For example, the actuators can be configured to provide a vibration or click. They can also provide a bias force, which the user can press against in order to activate the button.

Figure 17:
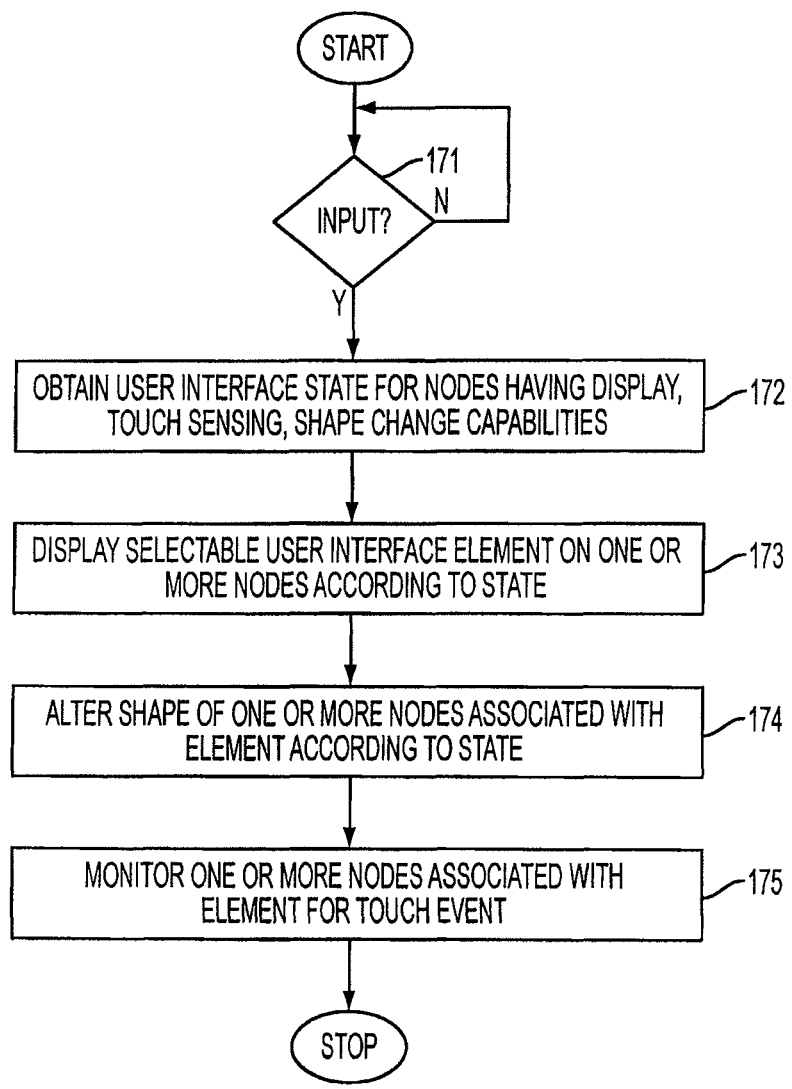
FIG. 17 illustrates an exemplary method for changing the topography of a user interface of a touch screen according to embodiments of the invention.

FIG. 17 illustrates an exemplary method for changing the topography of a user interface of a touch screen according to embodiments of the invention. In the example of FIG. 17, a determination can be made about whether an input has been received (171). The input can be from a user of a touch sensitive device. For example, the user can input a request to form a particular user interface. The input can also be a touch or near touch on the user interface surface. The input can also be from an application running on the device. For example, a telephone application running on the device can input a command to form a telephone user interface. The input can also be from the device itself. For example, upon powering up, a device can input a command to form a user interface for that particular device type.

Based on the input, a user interface state can be obtained for a user interface surface having a plurality of nodes with at least display, touch sensing, and shape changeable capabilities (172). For example, if a user inputs a request for a keypad, the user interface state can be obtained that indicates a user interface with a keypad should be formed. If a scroll wheel application starts running, the user interface state can be obtained that indicates a user interface with a scroll wheel should be formed. If the device is turned on as a media player, the user interface state can be obtained that indicates a user interface with audio buttons should be formed.

According to the user interface state, a selectable user interface element can be displayed on one or more of the nodes (173). Concurrent therewith, the shape of the one or more nodes associated with the user interface element can be physically altered (174). For example, for a keypad state, the user interface nodes can raise above the initial user interface surface to form push buttons and the numbers 0-9 can be displayed on the push buttons to be selected by the user. The one or more nodes can be monitored for a touch or near touch as an input to cause the device to perform an operation associated with the nodes (175).

Figure 18:
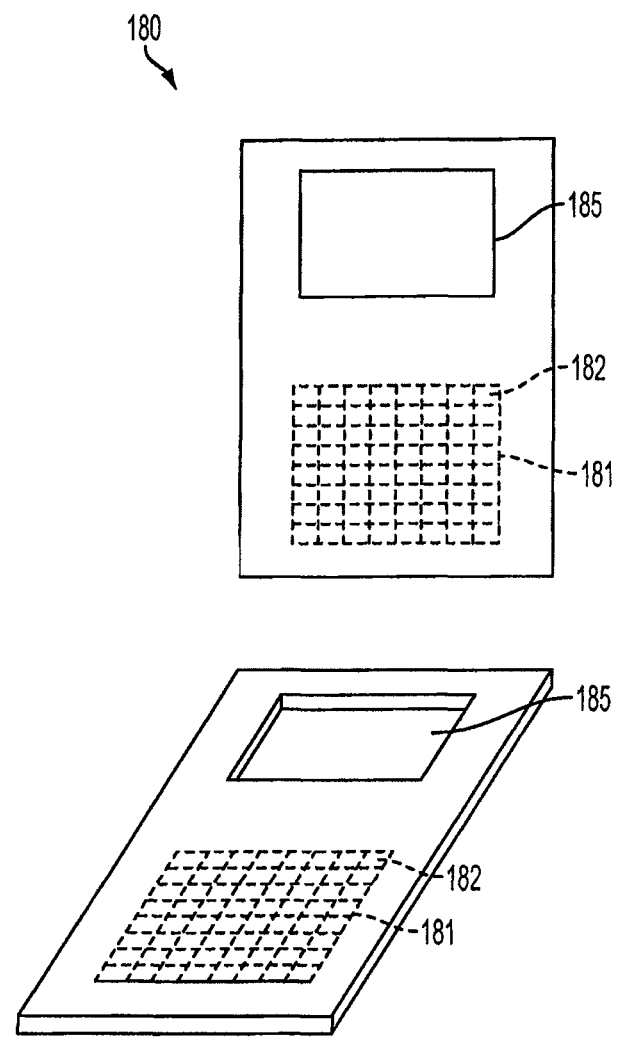
FIG. 18 illustrates an exemplary touch sensing device having a user interface that can change topography according to embodiments of the invention.

FIG. 18 illustrates an exemplary touch sensing device that can change topography according to embodiments of the invention. The touch sensing device 180 can generally be configured to sense touches or near touches about a surface in order to provide inputs to a host device. The inputs can for example be used to operate a graphical user interface presented on display 185 of a host device. The touch sensing device 180 can include a touch pad, for example. The touch pad can be integrated within the host device as shown. Alternatively, the touch pad can be a separate mechanism in communication with the host device. When integrated, the touch sensing device 180 can be mounted within a housing of the host device or in some cases can be provided integrally with a portion of the host device as for example the housing or outer layer (e.g., skin) of the host device. The host device can be widely varied, and can generally correspond to any consumer electronic product. In some embodiments, the touch pad can be suitable for use in portable electronic devices and more particularly handheld electronic devices such as mice, cell phones and media players. In one example, the touch pad can be included in any of those media players manufactured by Apple Inc. of Cupertino Calif. (e.g., iPod™).

In the example of FIG. 18, the touch sensing device 180 can include shape changeable surface 181 having a plurality of shape changeable nodes 182. The shape changeable nodes can be configured to be deformable points or regions of the surface in order to affect the topography change at the surface. As shown in FIG. 18, the touch sensing device can include an upper unbroken, continuous surface, with no cracks or spaces between nodes. The nodes 182 can be integrated into the surface. As such, the nodes 182 can be hidden from view (as shown by the dotted lines). The nodes can be arranged in a variety of orientations. In the illustrated embodiment, the nodes can be positioned in a matrix of rows and columns. Each node can form a pixel capable of altering the surface of the touch sensing device in a non-trivial manner. The nodes can be activated singularly or in combination to form a variety of three-dimensional shapes about the surface. The arrangement of the surface can be flat (as shown) or angled, curved, or otherwise formed. In essence, the state of the surface can take any form. The nodes can be configured in a variety of ways. In one example, the surface can include a deformable layer that can be deformed by a plurality of actuators forming the nodes. The actuators can be separate from or integrated with the deformable layer. In some cases, the deformable layer and the actuators can be all in one (e.g., same material).

In one embodiment, various user interface states can be created by adjusting the topography of the touch sensing device surface. This can be for example accomplished by deforming some areas while leaving other areas undeformed (e.g., selectively deforming the touch surface). Generally speaking, raised and lowered portions can be created among level areas, thereby creating different physical layouts that can provide variable tactile feels and looks at the touch surface.

Figure 19:
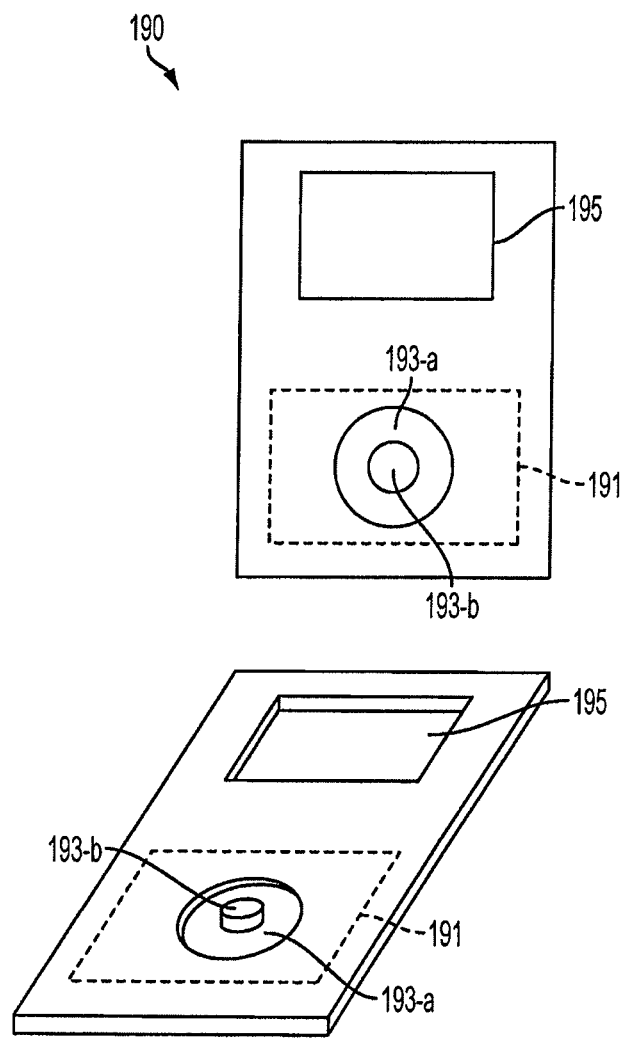
FIG. 19 illustrates an exemplary touch sensing device having a user interface that can change topography to form a scroll wheel according to embodiments of the invention.

FIG. 19 illustrates an exemplary touch sensing device having a user interface that can change topography to form a scroll wheel according to embodiments of the invention. In the example of FIG. 19, touch sensing device 190 can have a desired user interface state in which the user interface can form scroll wheel 193. As such, shape changeable nodes (such as nodes 182 of FIG. 18) located where the scroll wheel 193 should be can be raised and/or lowered on the surface 191, thereby informing the user of the location of the scroll wheel to be touched. The shape changeable nodes forming center button 193-b can be raised and shape changeable nodes forming surrounding circle 193-a can be lowered. In some embodiments, the shape changeable nodes forming the boundaries of the scroll wheel outer and inner circles can be raised to inform the user that the outer and inner circle areas can be active for touching. In some embodiments, the shape changeable nodes forming the interior of the inner circle can be raised to one level and the remaining interior of the outer circle can be raised to another level to inform the user that these raised areas can be active for touching. In some embodiments, touch sensing pixels corresponding to the unaltered areas of the surface, e.g., the nodes outside the outer circle, can be deactivated to form a null touch region of the touch sensing device or, conversely, only the touch sensing pixels corresponding to the altered areas of the surface can be activated to form an active touch region of the touch sensing device. A computing system can have functions associated with the scroll wheel 193 that can execute when the user touches the scroll wheel. In some embodiments, the user's touch can be a slide, rotate, press, translate, tap, or the like motion.

Figure 20:
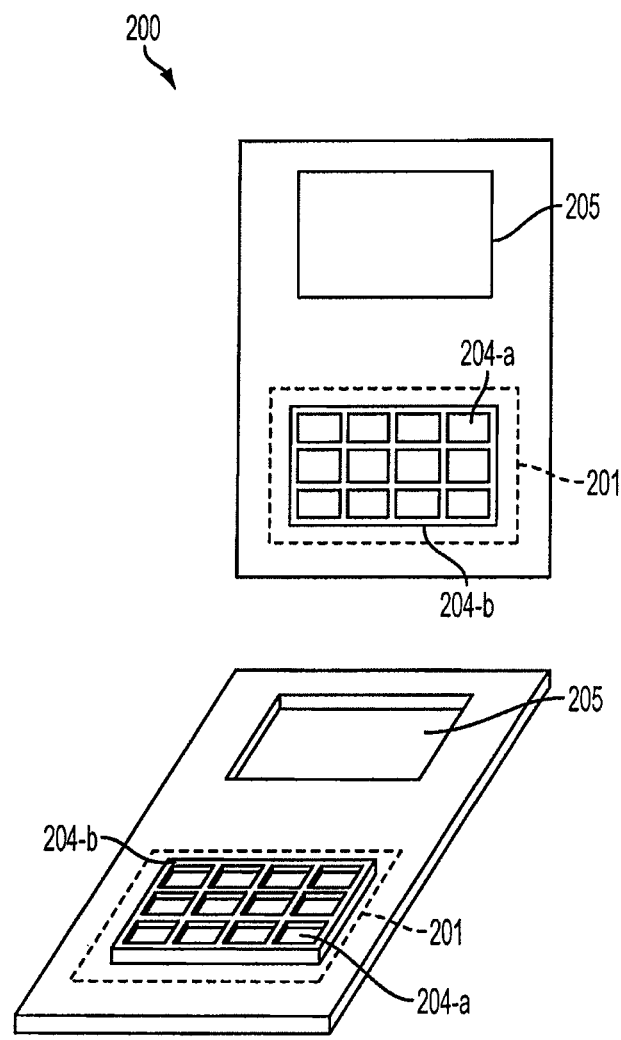
FIG. 20 illustrates an exemplary touch sensing device having a user interface that can change topography to form a keypad according to embodiments of the invention.

FIG. 20 illustrates an exemplary touch sensing device having a user interface that can change topography to form a keypad according to embodiments of the invention. In the example of FIG. 20, touch sensing device 200 can have a desired user interface state in which the user interface can form keypad 204. As such, shape changeable nodes (such as nodes 182 of FIG. 18) located where the keypad 204 should be can be raised and/or lowered on the surface 201, thereby informing the user of the location of the keypad to be touched. The shape changeable nodes forming boundaries 204-b of the keys can be raised and shape changeable nodes forming keys 204-a can be unaltered, resulting in recesses for the keys. In some embodiments, the shape changeable nodes can have adjustable character identifiers, described below, to display numbering on the keypad. In some embodiments, the shape changeable nodes forming the boundaries of the keys can be raised to inform the user where the keys are for touching. Alternatively, the keys themselves can be raised. A computing system can have functions associated with the keypad 204 that can execute when the user touches the keys of the keypad.

Figure 21:
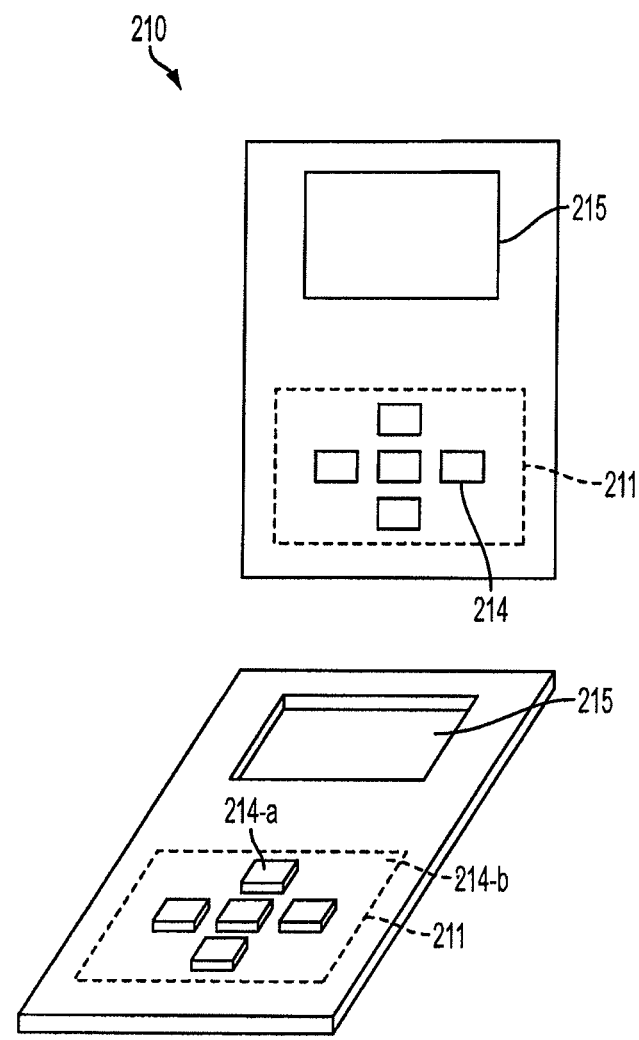
FIG. 21 illustrates an exemplary touch sensing device having a user interface that can change topography to form push buttons according to embodiments of the invention.

FIG. 21 illustrates an exemplary touch sensing device having a user interface that can change topography to form push buttons according to embodiments of the invention. In the example of FIG. 21, touch sensing device 210 can have a desired user interface state in which the user interface can form a plurality of push buttons 214. As such, shape changeable nodes (such as nodes 182 of FIG. 18) located where the push buttons 214 should be can be raised and/or lowered on the surface 211, thereby informing the user of the location of the push buttons to be touched. The shape changeable nodes forming push buttons 214-a can be raised. The remaining nodes can be unaltered and/or deactivated and the underlying touch sensors can be deactivated to provide null areas 214-b that do not respond to touch or change shape. Alternatively, the push buttons 214 can be recessed. A computing system can have functions associated with the push buttons 214 that can execute when the user touches the push buttons.

Figure 22:
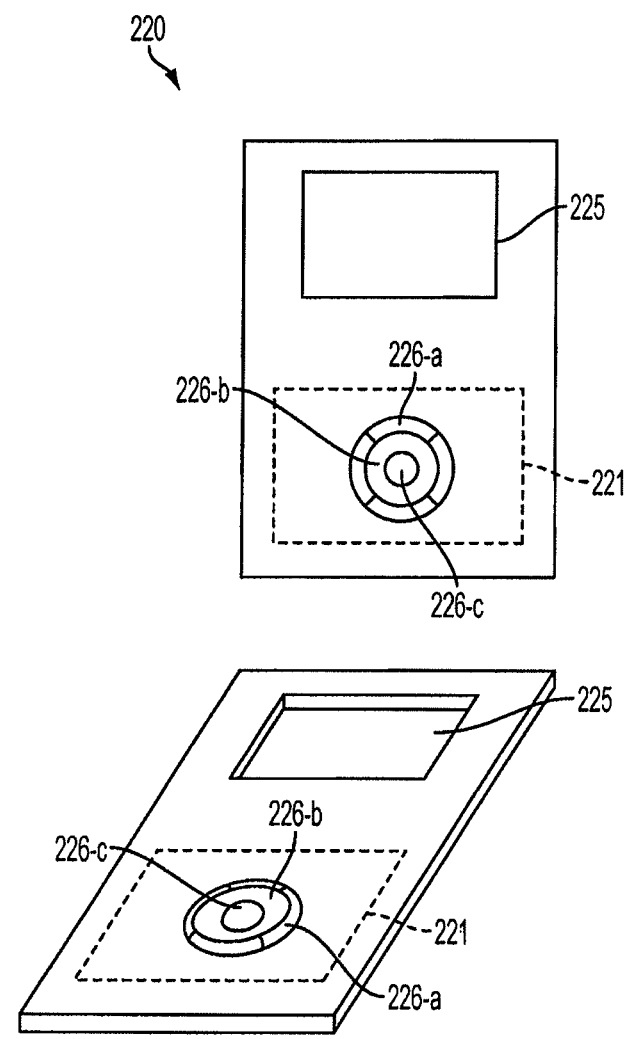
FIG. 22 illustrates an exemplary touch sensing device having a user interface that can change topography to form a scroll wheel according to embodiments of the invention.

FIG. 22 illustrates an exemplary touch sensing device having a user interface that can change topography to form a scroll wheel according to embodiments of the invention. In the example of FIG. 22, touch sensing device 220 can have a desired user interface state in which the user interface can form scroll wheel 226. As such, shape changeable nodes (such as nodes 182 of FIG. 18) located where the scroll wheel 226 should be can be raised and/or lowered on the surface 221, thereby informing the user of the location of the scroll wheel to be touched. The shape changeable nodes forming center button 226-c can be raised to form a dome and the shape changeable nodes forming the outer boundary 226-a can be raised to form a rounded border. The shape changeable nodes forming the scroll wheel circle 226-b can remain unaltered. Similar other embodiments to those of FIG. 19 can apply here. In some cases, a lowered portion can be used to create separate portions of the rounded border with each separate section offering a different functionality (e.g., button). A computing system can have functions associated with the scroll wheel 226 that can execute when the user touches the scroll wheel. In some embodiments, the user's touch can be a slide, rotate, press, translate, tap, or the like motion.

Figure 23:
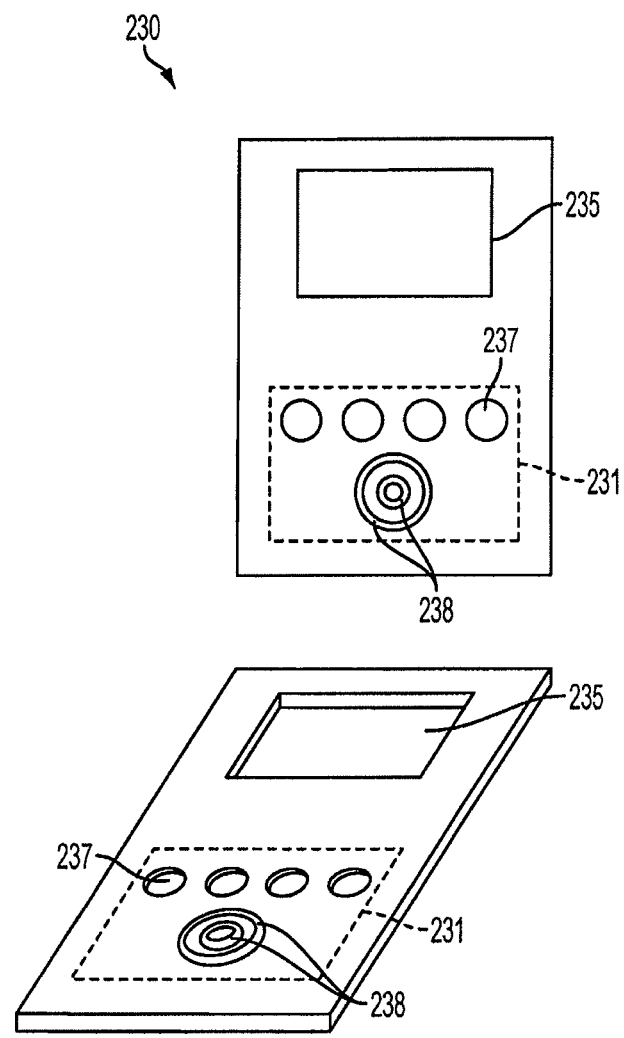
FIG. 23 illustrates an exemplary touch sensing device having a user interface that can change topography to form a scroll wheel and push buttons according to embodiments of the invention.

FIG. 23 illustrates an exemplary touch sensing device having a user interface that can change topography to form a scroll wheel and push buttons according to embodiments of the invention. In the example of FIG. 23, touch sensing device 230 can have a desired user interface state in which the user interface can form push buttons 237 and scroll wheel 238. As such, shape changeable nodes (such as nodes 182 of FIG. 18) located where the push buttons 237 and the scroll wheel 238 should be can be raised and/or lowered on the surface 231, thereby informing the user of the location of the push buttons and scroll wheel to be touched. The shape changeable nodes forming push buttons 237 can be lowered to form recesses. The shape changeable nodes forming the center button boundary and the outer boundary 238 can be lowered to form recessed channels. Similar other embodiments to those of FIG. 19 can apply here. A computing system can have functions associated with the push buttons 237 and the scroll wheel 238 that can execute when the user touches the push buttons or the scroll wheel. In some embodiments, the user's touch on the scroll wheel 238 can be a slide, rotate, press, translate, tap, or the like motion.

In some embodiments, each shape changeable node can include an adjustable character identifier that can change according to the user interface state. For example, in a phone state, as in FIG. 20, the shape changeable nodes can create the keypad and the adjustable identifiers can produce the numbering for each key. In a media player state, the shape changeable nodes can create a navigation pad and the adjustable identifiers can produce the control characters, such as "menu," "play/pause," and the like. This can for example be accomplished with illumination, mini displays, and the like. Adjustable character identifiers are disclosed in U.S. patent application Ser. No. 10/722,948, entitled "Touch Pad for Handheld Device," and Ser. No. 11/591,752, entitled "Touch Pad with Symbols Based on Mode," the contents of which are incorporated herein by reference in their entirety for all purposes.

In the examples of FIGS. 18 through 23, the shape changeable nodes can have a flexible membrane that can be stretched, retracted, or otherwise flexed by underlying movable or deformable parts. The individual nodes or the shape changeable membrane can also be used instead of the flexible membrane.

As shown in FIGS. 18 through 23, certain nodes of the user interface can raise above or lower below the initial surface, some can remain at their previous state above or below the initial surface, some can return to the initial surface, and some can remain unaltered in the initial surface, depending on the requirements for the user interface state. The user interface surface can be flat, as illustrated here, curved, or any other suitable shape capable of changing topography to provide a user interface. The user interface states can be based on a mode or operational state of a host device. This can be especially helpful in multifunctional devices, i.e., devices that incorporate separate function into a single device. For example, devices that include phone and music player functionality can utilize the embodiment shown in FIG. 20 when in a phone mode and can utilize the embodiment shown in FIG. 19 when in a music player mode.

It is to be understood that the shape changeable user interface is not limited to the user interface states illustrated here, but can include any state that can provide a user interface. In some instances, multiple user interface states can be combined.

Figure 24:
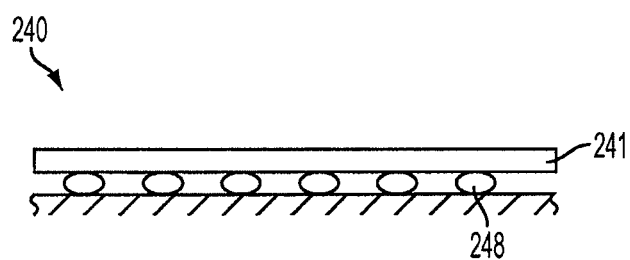
FIG. 24 illustrates an exemplary user interface that can change topography using shape changeable nodes according to embodiments of the invention.

FIG. 24 illustrates a side view of an exemplary user interface that can change topography using shape changeable nodes according to embodiments of the invention. In the example of FIG. 24, user interface 240 can include a plurality of selectable shape changeable nodes 248 spread about a surface 241. The surface 241 can be made of a membrane of flexible or deformable material, e.g., elastic, silicone, soft plastic, or materials that can temporarily deform into a discrete shape or form before returning to its original shape or form, with a front side that can receive a touch and a back side opposite the front side that can receive change from the nodes 248. The nodes 248 can be disposed adjacent to the back side of the surface 241, where each node 248 can be proximate to a particular deformable region of the surface. In some cases, the nodes 248 can be coupled, while in other cases they can be separate from the membrane.

In one example, the change in the surface 241 can be driven by shape changeable actuators that form the shape changeable nodes 248.

In some embodiments, the actuators can be made up of shape changeable material (symbolically illustrated by the circles in FIG. 24), such as nitinol, piezocrystals, and other suitable such material, that can elongate, shrink, or rotate to change shape. Generally speaking, shape changeable materials change their shape upon a stimulus. The stimulus can be electrical current, heat, magnetic, light, pressure, and the like. In one example, the shape changeable material can have a transformation temperature at which the material can transform from a predetermined original shape into a predetermined new shape. The transformation temperature can generally be above room temperature such that, upon heating, the material can transform into the new shape. Heating can be supplied by electrical current. When the electrical current passes through the material, the current can generate enough heat to heat the material to the transformation temperature, thereby causing the transformation. Conversely, when the electrical current is terminated, the material can cool to room temperature and transform back to its original shape. Alternative stimuli, e.g., magnetic energy, light, heat, etc., can also be used to heat the shape changeable material. This stimuli can also be used directly instead of heating.

Figure 28:
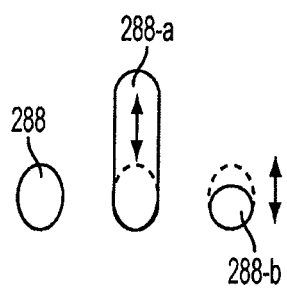
FIG. 28 illustrates an exemplary shape changeable node that can elongate or shrink for changing topography of a user interface according to embodiments of the invention.

FIG. 28 illustrates an exemplary shape changeable node that can be used as a shape changeable actuator for changing topography of a user interface according to embodiments of the invention. In the example of FIG. 28, actuator 288 (or shape changeable node) can have an initial unstimulated shape. In a stimulated state, the actuator 288 can elongate, stretch, raise, extend, or the like (see actuator 288-a) to push against the corresponding deformable region of the surface 241 of FIG. 24 to deform that region into a discrete shape or form above the initial surface (e.g., stretches the surface). Here, the shape changeable material of the actuators can be formulated to have two shapes—an initial shape and an elongated shape. During stimulation, an electrical current, heat or other stimulus can be applied to the actuator such that the actuator elongates to form the actuator 288-*a* in an elongated shape. Similarly, in a stimulated state, the actuator 288 can shorten, retract, lower, retreat, or the like (see actuator 288-*b*) to pull away from the corresponding deformable region of the surface 241 of FIG. 24 to deform that region into a discrete shape or form below the initial surface. Here, the shape changeable material of the actuator 288 can be formulated to have two shapes—an initial shape and a shortened shape. During stimulation, an electrical current, heat or other stimuli can be applied to the actuator 288 such that the actuator shortens to form the actuator 288-*b* in a shortened shape. In some embodiments where the shape changeable material of the actuator can be formulated to have three shapes—an initial shape, an elongated shape, and a shortened shape, the actuator can have different stimuli at which the respective transformations occur. Alternatively, the actuator can have the same stimulus applied in different amounts to produce the respective transformations.

Figure 29:
FIG. 29 illustrates an exemplary shape changeable node that can rotate for changing topography of a user interface according to embodiments of the invention.

FIG. 29 illustrates another exemplary shape changeable node that can be used as a shape changeable actuator for changing topography of a user interface according to embodiments of the invention. In the example of FIG. 29, actuator 298 (or shape changeable node) can have an initial unstimulated shape. In a stimulated state, the actuator 298 can shift, rotate, tilt, or the like to push against the corresponding deformable region of the surface 241 of FIG. 24 to deform that region into a discrete shape or form above the initial surface. Here, the shape changeable material of the actuator 298 can be formulated to have two shapes—an initial shape and an upright shape. During stimulation, a stimulus can be applied to the actuator such that the actuator can shift, rotate, tilt, or the like to form state 298-*a*. The amount that the actuator 298 changes shape can be controlled by the amount of stimulus, e.g., electrical current, applied to the actuator according to the user interface state.

Referring again to FIG. 24, in some embodiments, each deformable region of the surface 241 can deform into a discrete shape or form above the initial surface when the region's corresponding actuator 248 is selected to provide a force to push against the back side of the region and can deform into a discrete shape or form below the initial surface when the actuator provides a force to pull away from the back side of the region. In some embodiments, where the actuators 248 have "push against" change, each deformable region can deform into a discrete shape or form above the initial surface 241 when the region's corresponding actuator pushes against the back side of the region and otherwise remain undeformed in the initial surface. In some embodiments, where the actuators 248 have "pull away" change, each deformable region can deform into a discrete shape or form below the initial surface 241 when the region's corresponding actuator pulls away from the back side of the region and otherwise remain undeformed in the initial surface.

In some embodiments (as shown), the alterable regions of the surface 241 can be configured to form a matrix grid of rows and columns. It is to be understood, however, that the surface configuration is not so limited, but can include other suitable configurations. Similarly, in some embodiments (as shown), the changeable actuators 248 can be configured to form a matrix of rows and columns corresponding to the matrix grid of the surface's alterable regions. It is to be understood, however, that the actuators' configuration is not so limited, but can include other suitable configurations, including other resolutions.

In some embodiments, the actuators 248 can additionally carry input signals between the surface 241 and other components of the user interface 240. For example, the actuators 248 can carry touch signals from the surface 241 to the device processor to be processed and can carry display signals from the processor to the surface for display.

In alternate embodiments, the shape changeable actuators 248 can be electromechanical devices such as micro actuators, microelectromechanical (MEM) devices, piezoelectronics, and other suitable such miniature devices and can have various gears, cams, and other electromechanical devices to help deform the surface.

Figure 25:
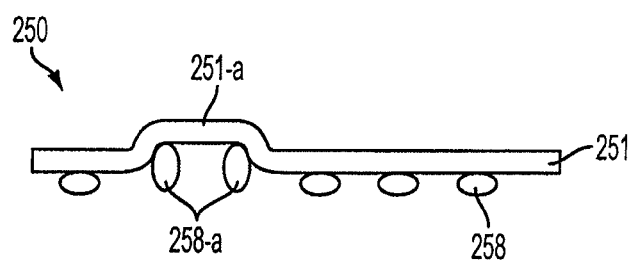
FIG. 25 illustrates an exemplary user interface that can change topography using shape changeable nodes to raise portions of the user interface surface according to embodiments of the invention.

FIG. 25 illustrates an exemplary user interface that can change topography using shape changeable nodes to raise portions of the user interface surface according to embodiments of the invention. In the example of FIG. 25, one or more shape changeable nodes 258-*a* can be selectively stimulated to change shape to push against their corresponding regions 251-*a* of the surface 251 and deform the corresponding regions into discrete arcs above the initial surface. The other regions of the surface 251 can remain undeformed in the initial surface when their nodes 258 are not stimulated to change shape.

Figure 26:
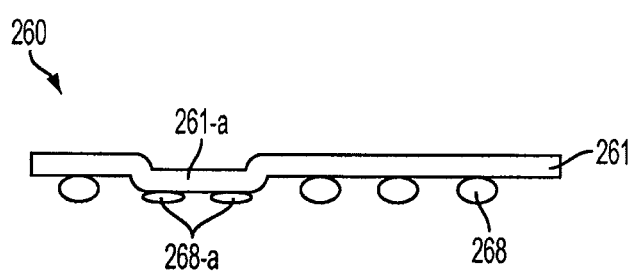
FIG. 26 illustrates an exemplary user interface that can change topography using shape changeable nodes to lower portions of the user interface surface according to embodiments of the invention.

FIG. 26 illustrates an exemplary user interface that can change topography using shape changeable nodes to lower portions of the user interface surface according to embodiments of the invention. In the example of FIG. 26, one or more shape changeable nodes 268-*a* can be selectively stimulated to change shape to pull away from their corresponding regions 261-*a* of the surface 261 and deform the corresponding regions into discrete hollows below the initial surface, where the other regions corresponding to unstimulated nodes can remain undeformed in the initial surface.

Figure 27:
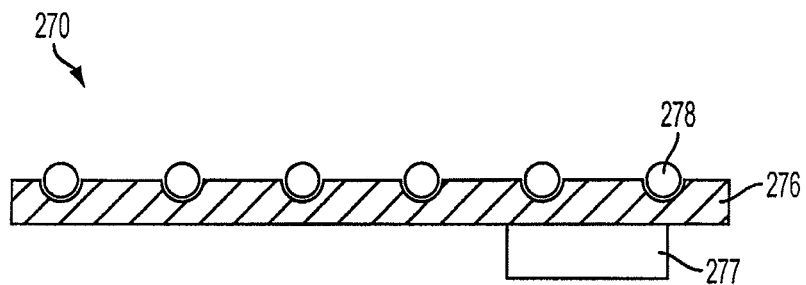
FIG. 27 illustrates an exemplary circuit for changing topography of a user interface using shape changeable nodes according to embodiments of the invention.

FIG. 27 illustrates an exemplary circuit for changing the user interface topography using shape changeable nodes according to embodiments of the invention. The circuit can for example generally be used with the user interface shown in FIGS. 24 through 26. The circuit 270 can include ASIC 277 that can be operatively coupled to PCB 276 that can be operatively coupled to a plurality of the shape changeable nodes 248, 258, 268 of FIGS. 24 through 26, respectively. In FIG. 27, the PCB 276 and/or ASIC 277 can cause a stimulus, e.g., an electrical current, to be applied to the nodes 278. The nodes 278 can change shape when stimulated by the stimulus and can remain unchanged when not. The connections between the PCB 276 and/or ASIC 277 and the nodes 278 can include, for example, individual switches for each nodes, where a particular node's switch can close when the node is selected to be stimulated so as to transmit the stimulus and can remain open when not.

In the examples of FIGS. 24 through 26, the shape changeable nodes 248, 258, 268, respectively, can be proximate to their respective dynamic surfaces 241, 251, 261 that can be stretched, retracted, or otherwise flexed by the underlying nodes. The dynamic surfaces can be replaced with individual nodes or with a shape changeable membrane proximate to the nodes. Alternatively, both the nodes and the dynamic surfaces can be replaced with the shape changeable membrane that itself can change shape to alter the user interface.

In some embodiments, portions of the dynamic surfaces can be fixed or anchored to prevent either upward or downward deformation in those areas. These portions can be interspersed with and around nodes, depending on the needs of the system.

Figure 30:
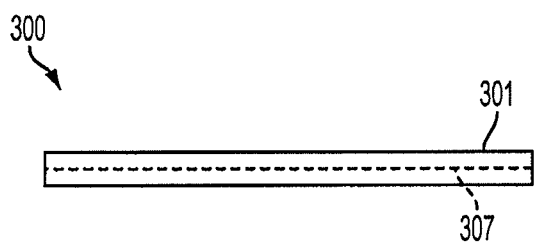
FIG. 30 illustrates an exemplary user interface that can change topography having a sensing device integrated with the user interface according to embodiments of the invention.
Figure 31:
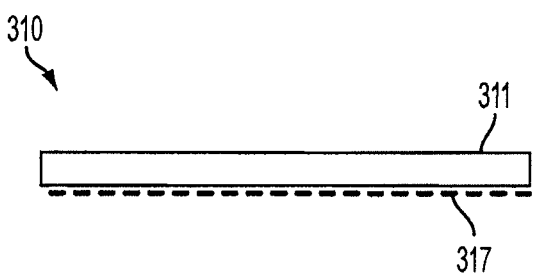
FIG. 31 illustrates an exemplary user interface that can change topography having a sensing device applied to a surface of the user interface according to embodiments of the invention.
Figure 32:
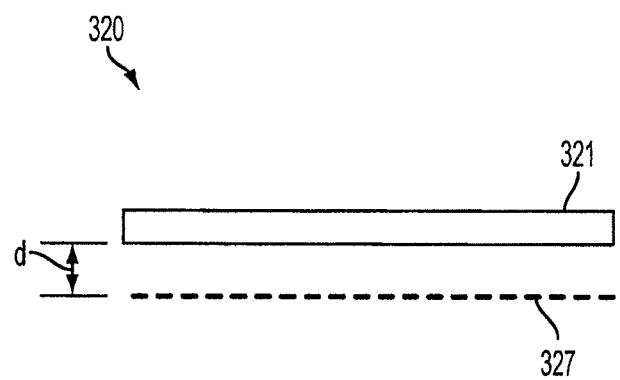
FIG. 32 illustrates an exemplary user interface that can change topography having a sensing device separate from the user interface according to embodiments of the invention.

In order to generate inputs at the user interface of FIGS. 24 through 26, the user interface can include a sensing device capable of detecting a touch or near touch at the user interface surface. FIGS. 30 through 32 illustrate exemplary user interfaces that can change topography having sensing devices according to embodiments of the invention. In the example of FIG. 30, user interface 300 can include surface 301 and sensing device 307 integrated within the surface. In the example of FIG. 31, user interface 310 can include surface 311 and sensing device 317 applied to the surface as a coating or layer. In the example of FIG. 32, user interface 320 can include surface 321 and sensing device 327 separated from the surface by distance d, which can be any distance suitable for operating the user interface according to embodiments of the invention. In one example, the sensing device can be a touch sensing device. If applied to or integrated within the user interface surface, the sensors of the touch sensing device can be configured to be flexible. The sensors can be embodied as lines (drive lines, sense lines, or electrodes). These sensors can be coated onto the surface of the membrane. These sensors can also be disposed inside the membrane. The lines and/or electrodes can be physical traces or wires, can be incorporated in a flex circuit, or can be deposited.

Figure 33:
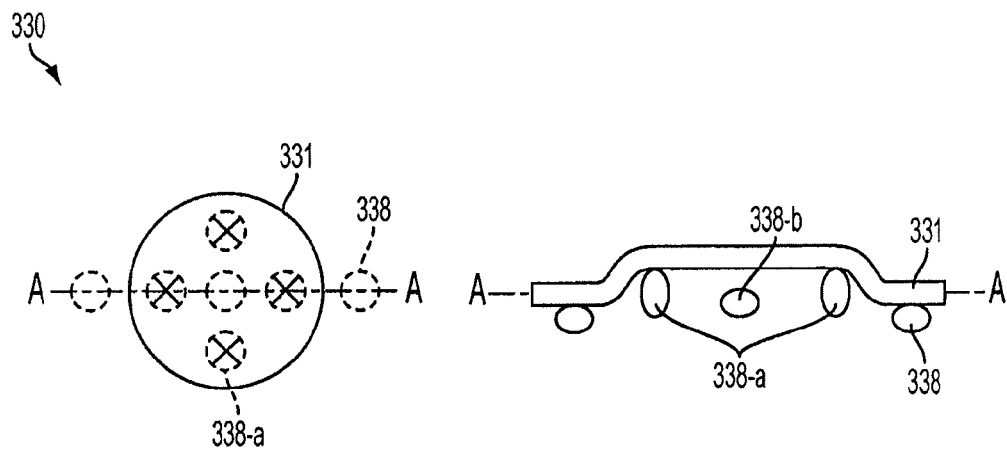
FIG. 33 illustrates an exemplary user interface that can change topography by selectively altering shape changeable nodes according to embodiments of the invention.

FIG. 33 illustrates an exemplary user interface that can change topography by selectively altering shape changeable nodes according to embodiments of the invention. The user interface can for example correspond to the user interface shown in FIGS. 24 through 32. In the example of FIG. 33, nodes 338 can be selectively controlled to form a physical button or key at deformable membrane 331 forming the user interface surface. This can be accomplished by activating a first set of nodes 338-*a* (symbolically illustrated by circles with "X" thereon), while leaving a second set of nodes 338-*b* unactivated. The first set of nodes 338-*a* can create a raised area in the deformable membrane 331. The raised section can represent the area to be pressed in order to actuate the button or key (i.e., the raised section can flex under force of a finger pressing thereon). More particularly, the first set of nodes 338-*a* can form outer nodes while the second set of nodes 338-*b* can form inner nodes. The nodes 338-*a* of the first set can be stimulated to change shape, while the node(s) 338-*b* of the second set can remain unchanged, thereby leaving a pliable portion of the surface within the area formed by the activated first set of nodes 338-*a* and above the second set of nodes 338-*b* within that area.

The raised area can form the physical button. Because the outer nodes 338-*a* can span an extended area, the deformable membrane 331 can include a plateau section stretched across the outer nodes. As shown, one or more inner nodes 338-*b* can be disposed under the plateau section.

Figure 34:
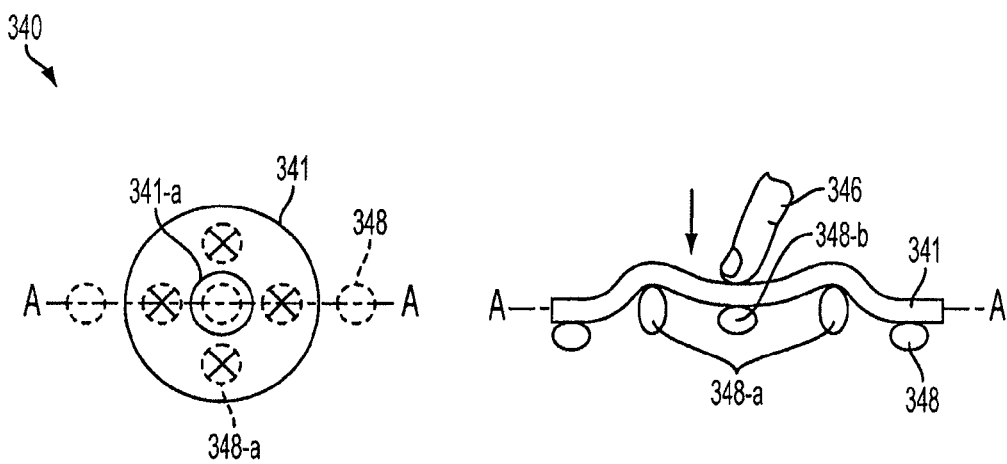
FIG. 34 illustrates an exemplary user interface that can change topography by selectively pressing on shape changeable nodes according to embodiments of the invention.

FIG. 34 illustrates an exemplary user interface that can change topography by selectively pressing on shape changeable nodes according to embodiments of the invention. In the example of FIG. 34, user interface 340 can include a raised section of deformable membrane 341 that forms the user interface surface. The raised section can be formed by the activation of a first set of nodes 348-*a* (symbolically illustrated by circles with "X" therein) to form a plateau section within raised section and above a second set of nodes 348-*b* that can be unactivated. The space provided between the plateau second and second set of nodes 348-*b* can allow a user to press finger 346 against and move the flexible plateau section to be in close proximity to or in contact with the second set of nodes 348-*b*.

Figure 35:
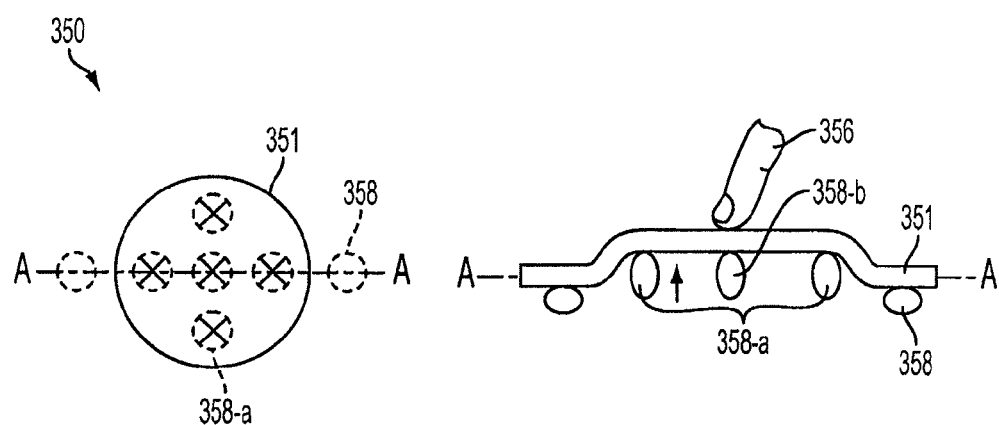
FIG. 35 illustrates an exemplary user interface that can change topography by selectively altering shape changeable nodes in response to pressure thereon according to embodiments of the invention.

FIG. 35 illustrates an exemplary user interface that can change topography by selectively altering shape changeable nodes in response to pressure thereon according to embodiments of the invention. In the example of FIG. 35, user interface 350 can detect a touch by finger 356 on a raised section of deformable membrane 351 forming the user interface surface and register the touch as a button input. The touch can be a press on a unactivated node (such as node 348-*b* of FIG. 34). The pressure of the finger 356 on the unactivated node can stimulate the node 358-*b*, causing it to change shape and provide an upward force on the surface 351. That upward force can be a form of haptic feedback felt by the finger 356 to inform the user that the user's finger did indeed press on the user interface 350. Other forms of haptic feedback can also be provided by the node, e.g., a vibration, an electrical impulse, and the like. The node 358-*b* can simply change from an unactivated state to an activated state, thereby helping to lift the finger 356 up. This can give the user physical feedback that the button has been activated. The raised section can now be formed by the activation of nodes 358-*a*, 358-*b* (symbolically illustrated by circles with "X" therein).

In the examples of FIGS. 33 through 35, the shape changeable nodes 338, 348, 358 can be proximate to their respective dynamic surfaces 331, 341, 351 that can be stretched, retracted, or otherwise flexed by the underlying nodes. The dynamic surfaces can be replaced with individual nodes or with a shape changeable membrane proximate to the shape changeable nodes. Alternatively, both the shape changeable nodes and the dynamic surfaces can be replaced with the shape changeable membrane that itself changes shape to alter the user interface.

Figure 36:
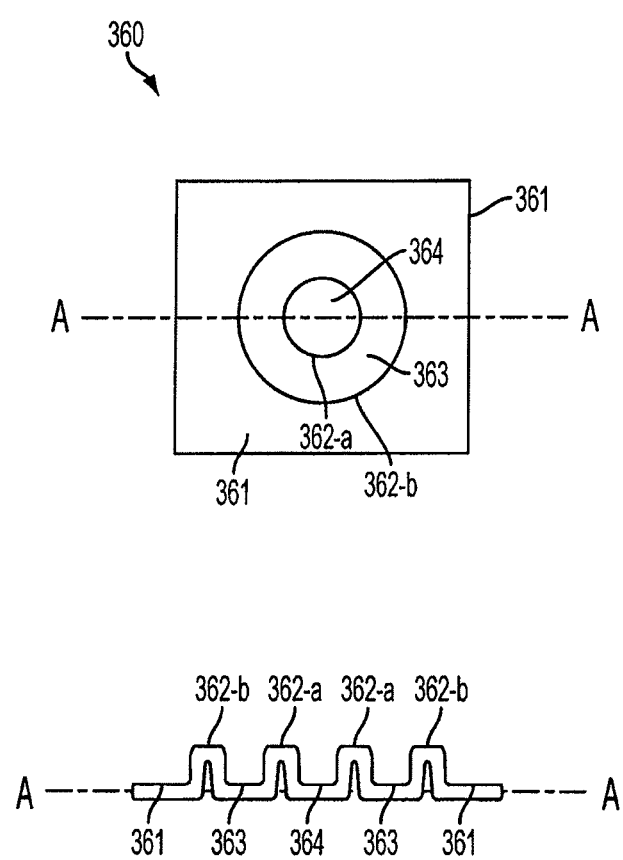
FIG. 36 illustrates an exemplary touch pad having a user interface that can change topography and selectively activate touch regions associated with the change according to embodiments of the invention.

FIG. 36 illustrates an exemplary touch pad having a user interface that can sense a touch or near touch and change topography according to embodiments of the invention. In the example of FIG. 36, at least a portion of shape changeable surface 361 can form a scroll wheel having center region 364, outer region 363, and boundaries 362-*a* and 362-*b* that can physically help define the regions. The shape changeable nodes forming boundaries 362-*a* and 362-*b* can be raised and the nodes forming center region 364 and outer region 363 can remain unaltered, as shown by a cross section at line A-A. Because the scroll wheel at the center button 364 or within the outer circle 363 can be associated with inputs, these elements can have active touch regions. A touch can be detected in these regions. By way of example, the center region 364 can represent a center button used for making selection and initiating commands, i.e., by pressing, while the outer region 363 can represent a navigation region for traversing content on a screen, i.e., by swirling a finger about the region. Conversely, because the remaining portions of the shape changeable surface 361, i.e., outside the outer boundary 362-*b* can be unassociated with inputs, these portions can have null touch regions. A touch can be ignored in these regions. In some embodiments, shape changeable nodes in these null touch regions can also be deactivated so as not to alter during this user interface state. A computing system can have functions associated with the active touch regions that can execute when the user touches these regions. Because the sensing and shape changeable regions can be dynamic, the shape changeable (protruding, recessed, and flat) and sensed regions (active and null) can be changed from what is shown. That is, the computing system can change shape and sensing capabilities while matching them to different functions, thus, enabling switching from the scroll wheel shown to something different, such as a keypad of a phone.

Figure 37:
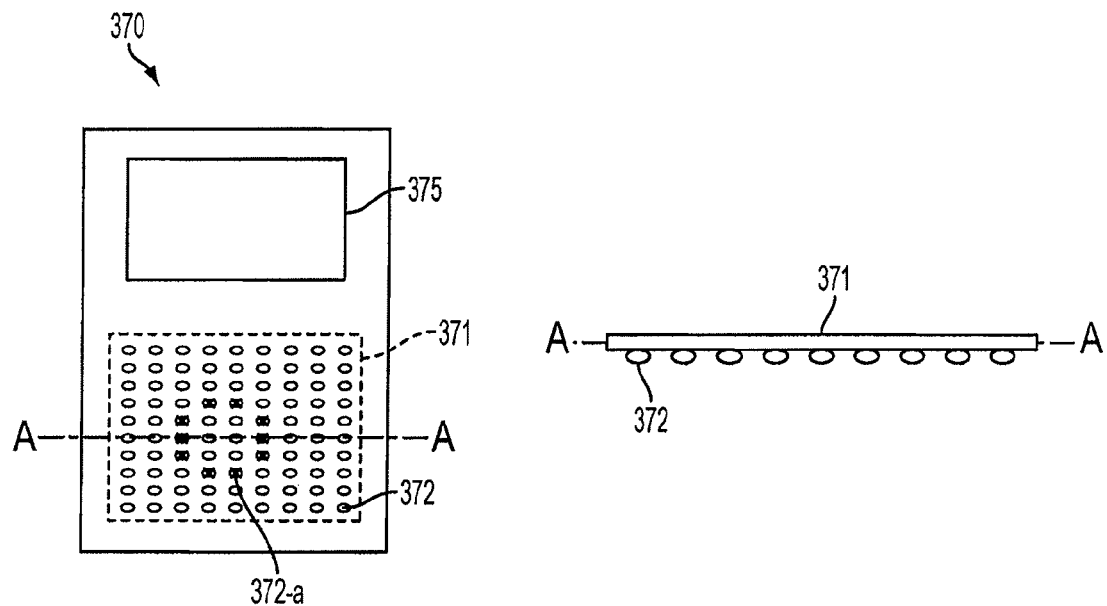
FIG. 37 illustrates an exemplary user interface of a touch pad that can change topography based on a sensed touch according to embodiments of the invention.
Figure 38:
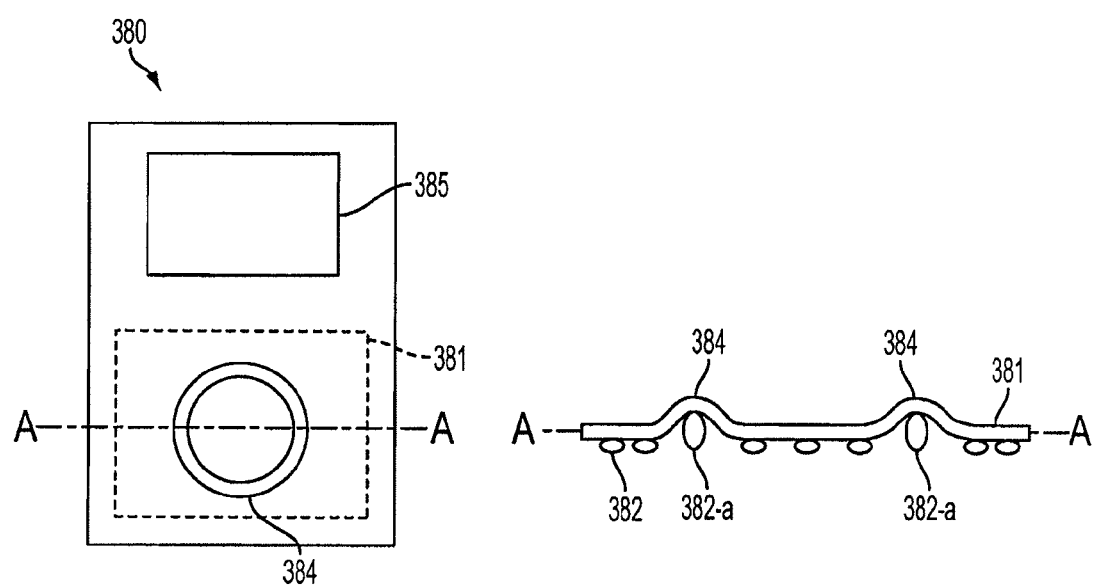
FIG. 38 illustrates an exemplary user interface of a touch pad that can change topography to form a scroll wheel based on a sensed touch according to embodiments of the invention.

FIGS. 37 and 38 illustrate exemplary touch pads having a user interface that can sense a touch or near touch and change topography according to embodiments of the invention. In the example of FIG. 37, touch pad 370 can have a series of nodes 372 that can change the shape of surface 371. A cross section at line A-A shows the nodes 372 in the touch pad 370. The touch pad 370 can form a flat surface. In the example of FIG. 38, touch pad 380 can similarly have a series of nodes 382 that can change the shape of surface 381 to form circular scroll wheel 384. The scroll wheel can be formed by selected nodes (indicated by "X" in FIG. 37, for example). The cross section at line A-A shows the nodes 382-*a* that can change their state in order to raise user interface surface 381 in select areas or points, thereby forming the scroll wheel 384 and informing the user of the location of the scroll wheel. In one example, the nodes can include an actuator that can push upwards on the inner surface of an elastic or flexible member, thereby raising a select portion of the surface. The actuators can be widely varied. The actuators can for example be formed from a shape changeable material. As mentioned above in FIG. 36, a touch surface can be controlled with null and activate regions as needed.

Figure 39:
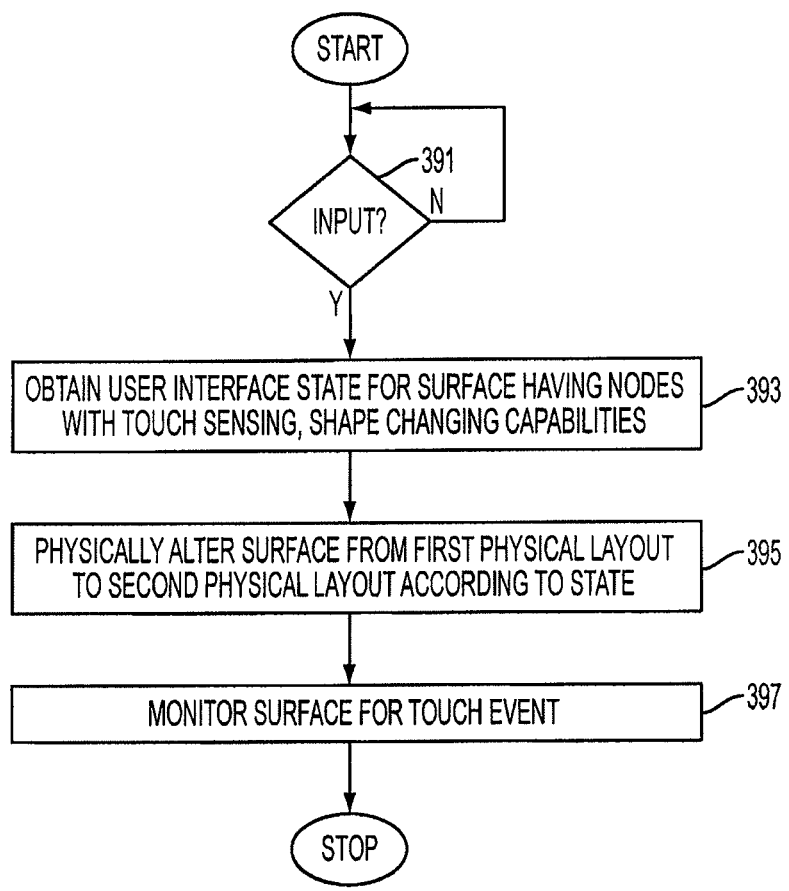
FIG. 39 illustrates an exemplary method of changing the topography of a user interface of a touch pad according to embodiments of the invention.

FIG. 39 illustrates an exemplary method of changing the topography of a user interface of a touch pad according to embodiments of the invention. The method can for example be used in any of the examples shown in FIGS. 24 through 38. In the example of FIG. 39, a determination can be made about whether an input has been received (391). The input can be from a user of a touch sensitive device. For example, the user can input a request to form a particular user interface. The input can also be a touch or near touch on the user interface surface. The input can also be from an application running on the device. For example, a telephone application running on the device can input a command to form a telephone user interface. The input can also be from the device itself. For example, upon powering up, a device can input a command to form a user interface for that particular device type.

Based on the input, a user interface state can be obtained for a user interface surface having a plurality of nodes with at least touch sensing and shape changeable capabilities (393). For example, if a user inputs a request for a keypad, the user interface state can be obtained that indicates a user interface with a keypad should be formed. If a scroll wheel application starts running, the user interface state can be obtained that indicates a user interface with a scroll wheel should be formed. If the device is turned on as a media player, the user interface state can be obtained that indicates a user interface with audio buttons should be formed.

According to the user interface state, the user interface surface can be physically altered from a first physical layout to a second physical layout, where each layout can represent a mode of an electronic device (395). For example, for a keypad state, the user interface surface can physically alter from a flat layout with no buttons to a non-flat layout with numerous keypad buttons to represent a keypad mode of the device.

The surface can be monitored for a touch or near touch as an input to cause the device to perform an operation (397). In some cases, the touch sensors can be monitored at select locations, i.e., areas assigned to receive touch inputs in order to initiate a certain functionality. By way of example, the monitoring circuit can create active and null regions.

Figure 40:
FIG. 40 illustrates an exemplary user interface that can change topography using a shape changeable membrane according to embodiments of the invention.

FIG. 40 illustrates a side view of an exemplary user interface that can change topography using a shape changeable membrane according to embodiments of the invention. In the example of FIG. 40, user interface 400 can include dynamic surface 401. The dynamic surface 401 can be a layer or a matrix of shape changeable material that can elongate, shrink, or rotate to change shape when selectively stimulated. The amount that the surface 401 changes shape can be controlled by the amount of stimulus, e.g., electrical current, applied to the surface, according to the user interface state of the surface. Any suitable shape changeable material can be used, including for example nitinol. The shape changeable material can be a single deformable membrane or it can for example work in cooperation with a deformable or flexible material (e.g., embedded or applied to a surface).

In some embodiments, the alterable regions of the surface 401 can be configured to form a matrix grid of rows and columns. It is to be understood, however, that the surface configuration is not so limited, but can include other suitable configurations.

In some embodiments, a particular region of the surface 401 can change shape to form a discrete shape or form above the initial surface when the region is stimulated and can change shape to form a discrete shape or form below the initial surface when the region is stimulated.

Figure 41:
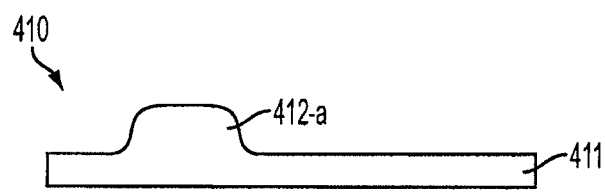
FIG. 41 illustrates an exemplary user interface that can change topography using a shape changeable membrane to raise portions of the user interface surface according to embodiments of the invention.

FIG. 41 illustrates a side view of an exemplary user interface that can change topography using a shape changeable membrane to raise portions of the user interface surface according to embodiments of the invention. In the example of FIG. 41, shape changeable regions 412-*a* can be selectively stimulated to change shape to form a discrete arc above the initial surface 411. The other regions of the surface 411 can remain unchanged in the initial surface when they are not stimulated.

Figure 42:
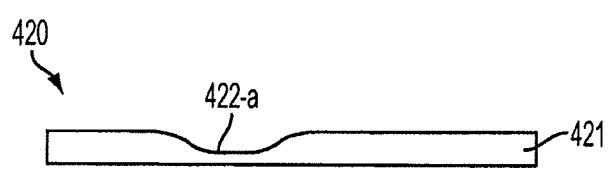
FIG. 42 illustrates an exemplary user interface that can change topography using a shape changeable membrane to lower portions of the user interface surface according to embodiments of the invention.

FIG. 42 illustrates a side view of an exemplary user interface that can change topography using a shape changeable membrane to lower portions of the user interface surface according to embodiments of the invention. In the example of FIG. 42, shape changeable regions 422-*a* can be selectively stimulated to change shape to form a discrete hollow below the initial surface 421, while the other regions of the surface can remain unchanged in the initial surface when they are not stimulated.

Figure 43:
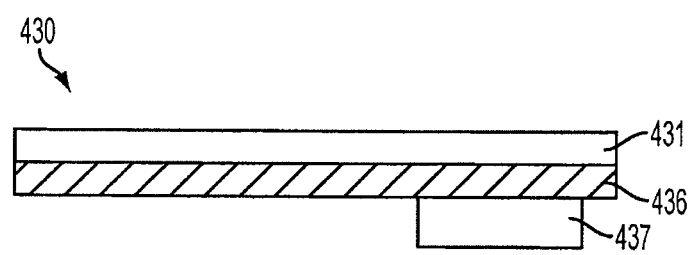
FIG. 43 illustrates an exemplary circuit for changing topography of a user interface using a shape changeable membrane according to embodiments of the invention.

FIG. 43 illustrates an exemplary circuit for changing the user interface topography using a shape changeable membrane according to embodiments of the invention. The circuit 430 can include ASIC 437 that can be operatively coupled to PCB 436 that can be operatively coupled to the dynamic surfaces 401, 411, 421 of FIGS. 40 through 42, respectively. In FIG. 43, the PCB 436 and/or the ASIC 437 can cause a stimulus, e.g., an electrical current, to be applied to alterable regions of the surface 431. The alterable regions can change shape when stimulated by the stimulus and can remain unchanged when not. The connections between the PCB 436 and/or ASIC 437 and the regions can include, for example, individual switches for each region, where a particular region's switch can close when the region is selected to be stimulated so as to transmit the stimulus and can remain open when not. Alternatively, the PCB 436 can be coupled to the surface via a flex circuit. Alternatively, the PCB 436 can be replaced with a flex circuit.

It should be appreciated that the user interface can have touch sensing capabilities. The sensing technology can be integrated with (e.g., embedded), applied to (e.g., attached) or be separate from the surface. In one example, capacitive sensing can be used. For example, the sensors can be embedded or applied to the inner surface of the user interface. In another example, proximity sensing can be used. For example, proximity sensors can be disposed underneath but decoupled from the user interface surface. Of course, other sensing technologies can also be used.

Figure 44:
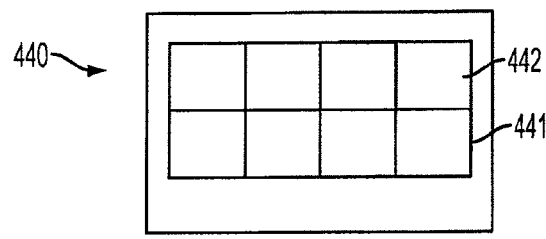
FIG. 44 illustrates an exemplary user interface that can change topography based on a location of a touch event according to embodiments of the invention.
Figure 45:
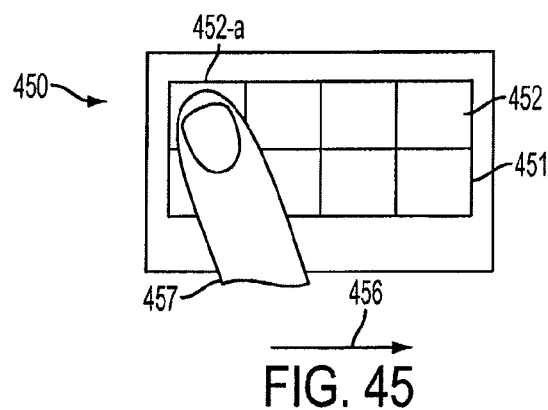
FIG. 45 illustrates an exemplary user interface changing topography at a location of a touch event according to embodiments of the invention.
Figure 46:
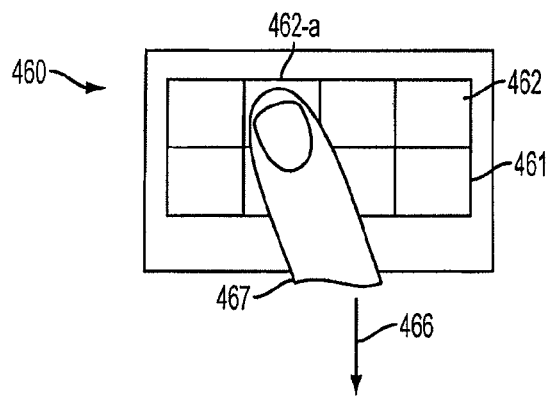
FIG. 46 illustrates an exemplary user interface changing topography at a location resulting from a horizontal scroll touch event according to embodiments of the invention.
Figure 47:
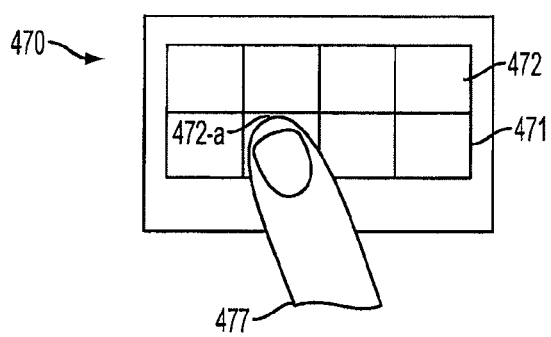
FIG. 47 illustrates an exemplary user interface changing topography at a location resulting from a vertical scroll touch event according to embodiments of the invention.
Figure 48:
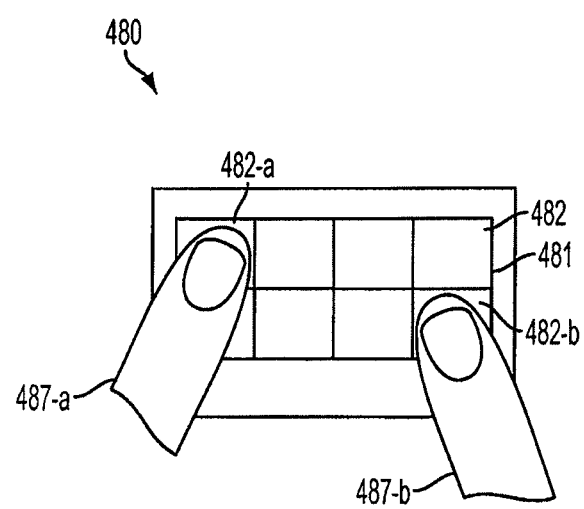
FIG. 48 illustrates an exemplary user interface changing topography at multiple locations based on multiple touch events according to embodiments of the invention.

FIGS. 44 through 48 illustrate exemplary user interfaces that can change topography based on a location of a touch event according to embodiments of the invention. Rather than altering shape changeable nodes of a user interface prior to a user touching the user interface surface, the nodes can be altered dynamically as the user touches or near touches the surface at a certain user interface element, thereby informing the user of the location of the user interface element being or about to be touched. In the example of FIG. 44, shape changeable nodes 442 of user interface 440 can be unaltered. In the example of FIG. 45, finger 457 can touch a region or point of user interface surface 451, thereby causing node 452-*a*, associated with that region or point, to change the shape near the region or point. For example, the node can form a raised or recessed region or point proximate to the touch. The user therefore can know where the user is touching at any given moment during a touch event. In the example of FIG. 46, as finger 467 moves to a different location (e.g., makes sliding, scrolling, tapping, or the like motion 456 of FIG. 45 to the right) on user interface surface 461, node 462-*a* proximate to the new location can change the shape of the surface and the previously touched node (such as node 452-*a* of FIG. 45) can change back to its original state. By way of example, if raised, node 452-*a* can lower back to a nominal position and, if lowered, node 452-*a* can raise back to the nominal position. In the example of FIG. 47, as finger 477 moves to a different location (e.g., makes sliding, scrolling, tapping, or the like motion 466 of FIG. 46 downward) on user interface surface 471, node 472-*a* proximate to the new location can change the shape of the surface and the previously touched node (such as node 462-*a* of FIG. 46) can change back to its original state. By way of example, if raised, node 462-*a* can lower back to a nominal position and, if lowered, node 462-*a* can raise back to the nominal position. In the example of FIG. 48, multi-touch can be implemented, where multiple fingers 487-*a* and 487-*b* touching respective nodes 482-*a* and 482-*b* can cause the nodes to change the shape of user interface surface 481 near each of the touches.

In one embodiment, the user interfaces shown in FIGS. 44 through 48 can be a single-touch or multi-touch screen display and can include a plurality of touch sensors grouped in rows and columns, for example, or some other appropriate configuration. The touch sensors can detect one or more touches or near touches on the user interface surface at one or more locations. The touch sensors can work as discrete sensors or together to form a larger sensor. Each touch sensor can raise, lower, or remain at an initial state, depending on the needs of the device. The touch display of the touch screen can also include a plurality of touch display nodes grouped in rows and columns, for example, or some other appropriate configuration. The display nodes can work as discrete displays or together to form a larger display (for example, a main display capable of distributing video or other applications). Each touch display node can operate as a shape changeable node by raising, lowering, or remaining at an initial state, individually, sequentially, collectively, or the like in order to change the user interface topography depending on the needs of the device.

In the examples of FIGS. 44 through 48, the shape changeable nodes can be individual nodes that can be raised or lowered by underlying movable or deformable parts. A flexible membrane or a shape changeable membrane can also be used instead of the individual nodes. The nodes and membranes can be substantially transparent or semi transparent so as to see the underlying touch displays.

Figure 49:
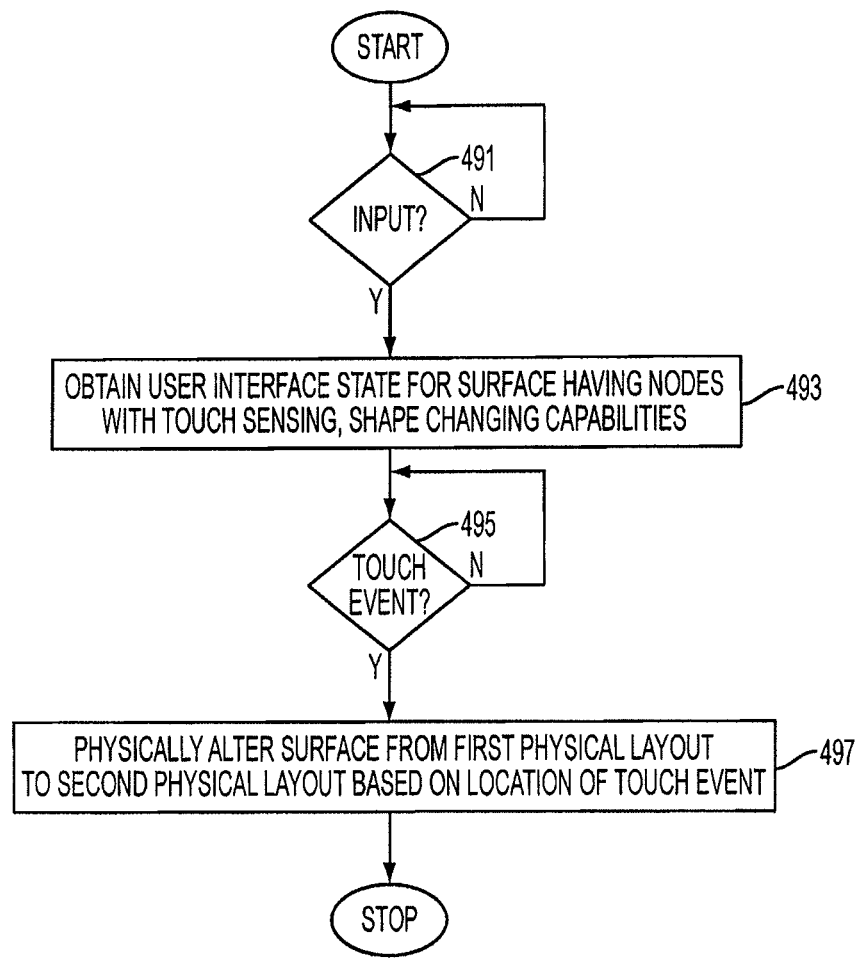
FIG. 49 illustrates an exemplary method for changing the topography of a user interface based on a location of a touch event according to embodiments of the invention.

FIG. 49 illustrates an exemplary method for changing the topography of a user interface based on a location of a touch event according to embodiments of the invention. In the example of FIG. 49, a determination can be made about whether an input has been received (491). The input can be from a user of a touch sensitive device. For example, the user can input a request to form a particular user interface. The input can also be a touch or near touch on the user interface surface. The input can also be from an application running on the device. For example, a telephone application running on the device can input a command to form a telephone user interface. The input can also be from the device itself. For example, upon powering up, a device can input a command to form a user interface for that particular device type.

Based on the input, a user interface state can be obtained for a user interface surface having a plurality of nodes with at least touch sensing and shape changeable capabilities (493). For example, if a user, an application, or a device inputs a request for a user interface surface that physically alters based on a location of a touch or near touch, the user interface state can be obtained, indicating that a user interface alterable by a touch event should be formed.

A determination can be made about whether a touch event has been detected (495). The touch event can be either a touch or a near touch on the user interface surface.

Upon detection of the touch event and its location on the user interface surface, the surface can physically alter at that location from a first physical layout to a second physical layout, where each layout can represent a mode of an electronic device (497). For example, as a touch or near touch occurs at a location on the surface, that location can raise or lower to form the second physical layout, depending on the needs of the device. As the touch or near touch moves away from the location, that location can return to its original position to form the first physical layout, depending on the needs of the device.

Figure 50:
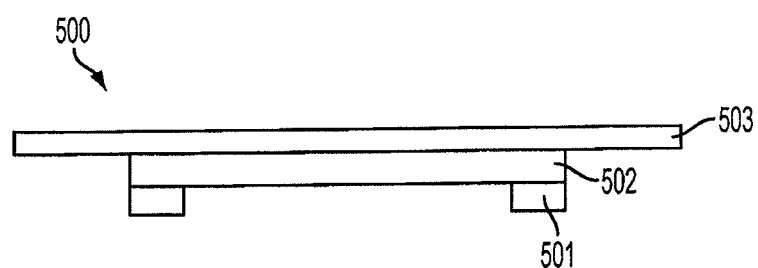
FIG. 50 illustrates an exemplary display device having a user interface that can change topography according to embodiments of the invention.

FIG. 50 illustrates an exemplary display device having a user interface that can change topography according to embodiments of the invention. In the example of FIG. 50, display device 500 can include translucent stretchable membrane 503 disposed over display 502, which can be in turn disposed on changeable nodes 501, which can be activated to raise or lower the display.

Figure 51:
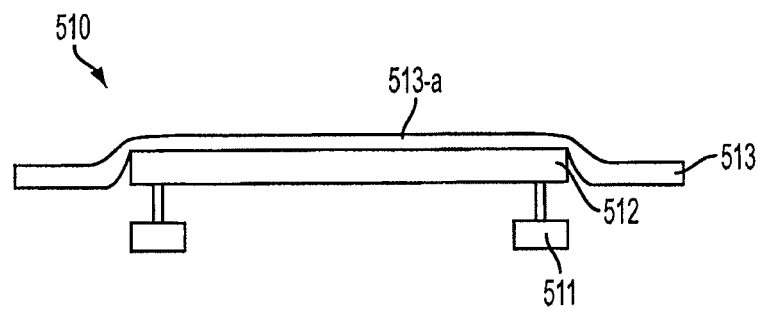
FIG. 51 illustrates an exemplary display device having a user interface that can change topography by raising a display screen according to embodiments of the invention.

FIG. 51 illustrates an exemplary display device having a user interface that can change topography by raising a display screen according to embodiments of the invention. In the example of FIG. 51, changeable nodes 511 can be stimulated to raise display 512. Upon raising, the display 512 can push against translucent stretchable membrane 513, causing the membrane to stretch and thin out at section 513-*a*. As the membrane thins out, it can become more transparent, making display 512 easier to view.

In some embodiments, the changeable nodes 501, 511 can be electromechanical devices. In some embodiments, the changeable nodes can be shape changeable material. In some embodiments, the changeable nodes can be stimulated to a user interface state that can include display viewing. In some embodiments, the membrane can be somewhat opaque in its nominal state and translucent or transparent in its stretched state.

Figure 52:
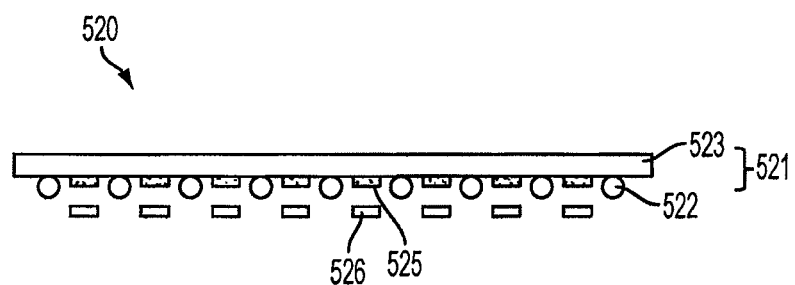
FIG. 52 illustrates an exemplary user interface that can change topography according to embodiments of the invention.

FIG. 52 illustrates an exemplary user interface that can change topography according to embodiments of the invention. In the example of FIG. 52, user interface 520 can include shape changeable user interface surface 521 having transparent or semi transparent flexible outer membrane 523 and shape changeable nodes 522, transparent or semi transparent touch sensing nodes 525, and display nodes 526. The flexible outer membrane 523 can form the touchable surface of the user interface of a touch sensitive device and can be expanded or retracted as the underlying shape changeable nodes 522 are altered, thereby changing the topography at the user interface surface 521. The membrane 523 can be elastic, silicone, rubber, soft plastic, or any material that can stretch under force and return to normal when the force is removed.

The touch sensing nodes 525 can be disposed adjacent to the shape changeable nodes 522 on an undersurface of the membrane 523, where the undersurface can be opposite the touchable surface. The touch sensing nodes 525 can detect a touch or near touch on the surface of the membrane 523. As shown in FIG. 52, the touch sensing nodes 525 can be positioned alternately with the shape changeable nodes 522. Alternatively, the touch sensing nodes 525 can be positioned between every two or more shape changeable nodes 522 or vice versa, depending on the needs of the user interface 520.

The display nodes 526 can be disposed adjacent to the shape changeable nodes 522 and the touch sensing nodes 525. The display nodes 526 can display user interface elements viewable through the membrane 523. As shown in FIG. 52, the display nodes 526 can be aligned with the touch sensing nodes 525. Alternatively, the display nodes 526 can be aligned with two or more touch sensing nodes 525 or vice versa and/or aligned with shape changeable nodes 522, depending on the needs of the user interface 520.

In some embodiments, the touch region and the shape changeable regions can substantially coincide. In some embodiments, the shape changeable regions can be positioned within the touch region, being either the same size as the touch region, smaller, or larger.

Figure 53:
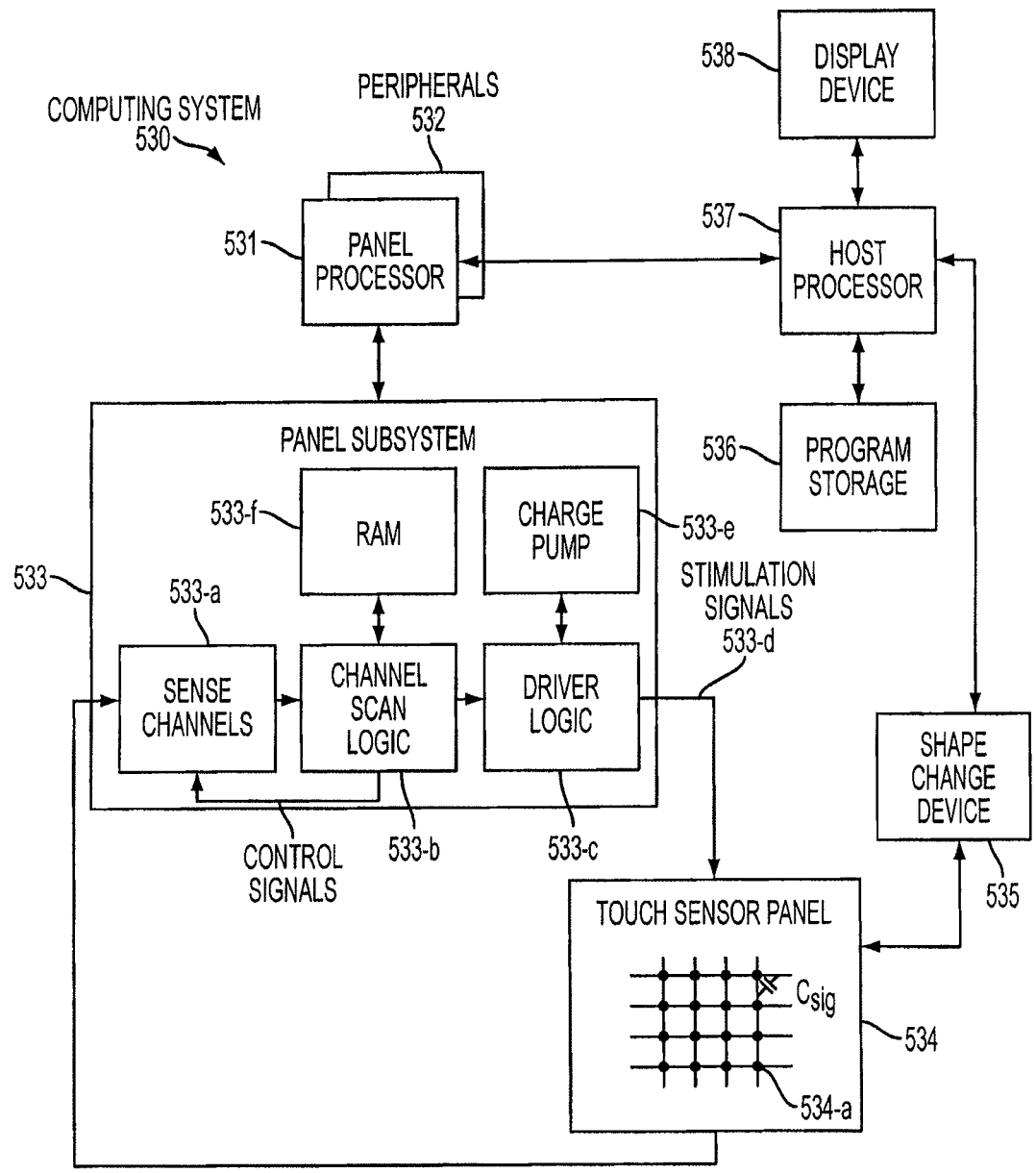
FIG. 53 illustrates an exemplary computing system having a user interface that can change topography according to embodiments of the invention.

FIG. 53 illustrates an exemplary computing system that can include one or more of the embodiments of the invention described herein. In the example of FIG. 53, computing system 530 can include one or more panel processors 531 and peripherals 532, and panel subsystem 533. Peripherals 532 can include, but are not limited to, random access memory (RAM) or other types of memory or storage, watchdog timers and the like. Panel subsystem 533 can include, but is not limited to, one or more sense channels 533-*a*, channel scan logic (analog or digital) 533-*b* and driver logic (analog or digital) 533-*c*. Channel scan logic 533-*b* can access RAM 533-*f*, autonomously read data from sense channels 533-*a* and provide control for the sense channels. In addition, channel scan logic 533-*b* can control driver logic 533-*c* to generate stimulation signals 533-*d* at various phases that can be simultaneously applied to drive lines of touch sensor panel 534. Panel subsystem 533 can operate at a low digital logic voltage level (e.g. 1.7 to 3.3V). Driver logic 533-*c* can generate a supply voltage greater that the digital logic level supply voltages by cascading two charge storage devices, e.g., capacitors, together to form charge pump 533-*e*. Charge pump 533-*e* can be used to generate stimulation signals 533-*d* that can have amplitudes of about twice the digital logic level supply voltages (e.g. 3.4 to 6.6V). Although FIG. 53 shows charge pump 533-*e* separate from driver logic 533-*c*, the charge pump can be part of the driver logic. In some embodiments, panel subsystem 533, panel processor 531 and peripherals 532 can be integrated into a single application specific integrated circuit (ASIC).

Touch sensor panel 534 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by the dielectric material. Each intersection of drive and sense lines can represent a capacitive sensing node and can be viewed as picture element (pixel) 534-*a*, which can be particularly useful when touch sensor panel 534 is viewed as capturing an "image" of touch. (In other words, after panel subsystem 533 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between the drive and sense lines and local system ground appears as a stray capacitance Cstray and the capacitance at the intersections of the drive and sense lines, i.e., the pixels, as a mutual signal capacitance Csig when the given drive line is stimulated with an alternating current (AC) signal. The presence of a finger or other object near or on the touch sensor panel can be detected by measuring changes to a signal charge present at the pixels being touched, which is a function of Csig. Each sense line of touch sensor panel 534 can drive sense channel 533-*a* in panel subsystem 533.

Dynamic shape change device 535 can change topography of a user interface of the computing system 530 according to embodiments of the invention. The shape change device 535 can have movable or deformable regions which can be selected to alter outward or inward to form a user interface, where the resulting user interface surface can inform the user of the location of user interface elements to be touched.

Computing system 530 can also include host processor 537 for receiving outputs from panel processor 531 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 537 can also perform additional functions that may not be related to panel processing, and can be coupled to program storage 536 and display device 538 such as an LCD display for providing a user interface to a user of the device. Display device 538 together with touch sensor panel 534, when located partially or entirely with the touch sensor panel, can form a touch screen. Dynamic shape change device 535 together with touch sensor panel 534 can provide a shape changeable user interface.

Note that one or more of the functions described above can be performed by firmware stored in memory (e.g. one of the peripherals 532 in FIG. 53) and executed by panel processor 531, or stored in program storage 536 and executed by host processor 537. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the sensor panel is not limited to a touch sensor panel, as described in FIG. 53, but can be a proximity sensor panel or any other sensor panel capable of sensing a touch or hover event and having a user interface to change topography according to embodiments of the invention. Furthermore, although the touch sensors in the touch sensor panel can be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations. In addition, the touch sensor panel described herein can be either a single-touch or a multi-touch sensor panel.

Figure 54:
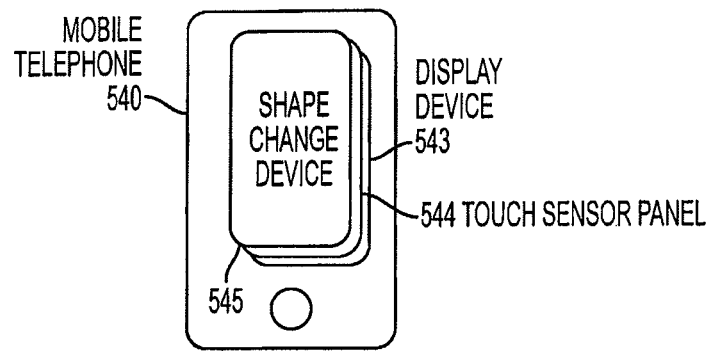
FIG. 54 illustrates an exemplary mobile telephone having a user interface that can change topography according to embodiments of the invention.

FIG. 54 illustrates an exemplary mobile telephone 540 that can include touch sensor panel 544, shape change device 545, display device 543, and other computing system blocks that can be utilized for changing topography of a user interface of the telephone.

Figure 55:
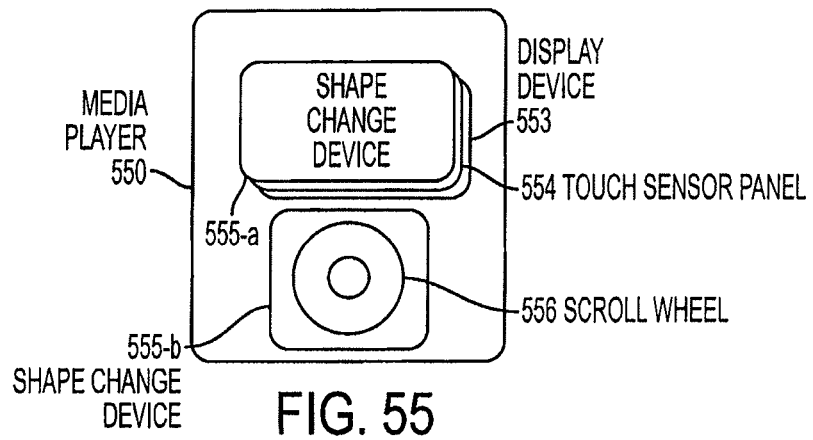
FIG. 55 illustrates an exemplary digital media player having a user interface that can change topography according to embodiments of the invention.

FIG. 55 illustrates an exemplary digital media player 550 that can include touch sensor panel 554, display device 553, shape change device 555-*a* which can alter a portion of the media player associated with the touch sensor panel and the display device, shape change device 555-*b* which can alter a portion of the media player to display scroll wheel 556, for example, and other computing system blocks that can be utilized for changing topography of a user interface of the media player.

Figure 56:
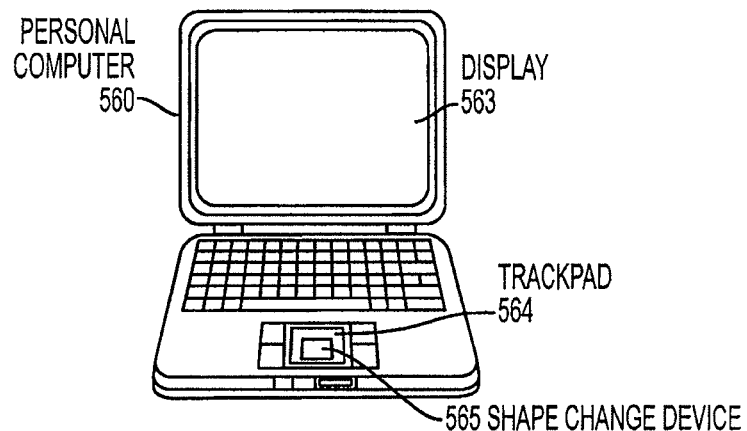
FIG. 56 illustrates an exemplary personal computer having a user interface that can change topography according to embodiments of the invention.

FIG. 56 illustrates an exemplary personal computer 560 that can include touch sensor panel (trackpad) 564, shape change device 565, display 563, and other computing system blocks that can be utilized for changing topography of a user interface of the personal computer.

The mobile telephone, media player, and personal computer of FIGS. 54 through 56, respectively, can improve the user experience by providing a user interface that can change topography according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A user interface comprising:
a shape changeable surface including a display, the surface configured to selectively alter topography of the display according to an input including a touch event, the selectively altering including:
altering a height of a first region of the surface to a first height and concurrently displaying a user interface object in the first region of the surface;
while the first region is at the first height and the user interface object is displayed, sensing the touch event on the surface at one or more touch sensing nodes;
determining a surface location of the touch event based on touch information received from the one or more touch sensing nodes; and
in response to a determination that the surface location is in the first region of the surface, automatically altering one or more shape changeable nodes at the first region of the surface to alter the height of the first region of the surface to a second height.

2. The interface of claim 1, wherein the input includes at least one of a user interface state and a touch event.

3. The interface of claim 1, wherein the shape changeable surface comprises individual nodes configured to alter according to the input.

4. The interface of claim 3, wherein the individual nodes alter by raising above or lowering below the initial shape changeable surface.

5. The interface of claim 1, wherein the shape changeable surface comprises a deformable material configured to alter according to the input.

6. The interface of claim 5, wherein the deformable material alters by deforming portions of the material to discrete shapes above or below the initial shape changeable surface.

7. The interface of claim 1, wherein the shape changeable surface comprises a shape changeable material configured to alter according to the input.

8. The interface of claim 7, wherein the shape changeable material alters by changing portions of the material to discrete shapes above or below the initial shape changeable surface.

9. The interface of claim 1, further comprising an input region associated with the shape changeable surface and configured to receive the input.

10. The interface of claim 1, wherein the display is configured to display at least one user interface element.

11. The interface of claim 1 incorporated into a touch sensitive device.

12. The interface of claim 11, the touch sensitive device incorporated into a computing system.

13. The interface of claim 1 incorporated into a mobile telephone.

14. The interface of claim 1 incorporated into a digital media player.

15. The interface of claim 1 incorporated into a personal computer.

16. A device for changing topography of a user interface comprising:
- a plurality of nodes proximate to a surface of a user interface, the user interface including a display, wherein each node is proximate to a particular region of the surface and configured to selectively alter according to an input including a touch event, the selectively altering including:
  - altering a height of a first region of the surface to a first height and concurrently displaying a user interface object in the first region of the surface;
  - while the first region is at the first height and the user interface object is displayed, sensing the touch event on the surface at one or more touch sensing nodes;
  - determining a surface location of the touch event based on touch information received from the one or more touch sensing nodes; and
  - in response to a determination that the surface location is in the first region of the surface, automatically altering one or more shape changeable nodes at the first region of the surface to alter the height of the first region of the surface to a second height.

17. The device of claim 16, wherein the nodes are electromechanical devices, each electromechanical device having an actuator configured to move according to the input so as to alter a proximate region of the surface.

18. The device of claim 16, wherein the nodes are shape changeable nodes, each shape changeable node comprising shape changeable material configured to change shape according to the input so as to alter a proximate region of the surface.

19. The device of claim 16, wherein the nodes are deformable nodes, each deformable node comprising deformable material configured to deform according to the input so as to alter a proximate region of the surface.

20. The device of claim 16, wherein the nodes alter by at least one of raising, lowering, elongating, shortening, stretching, retracting, or rotating.

21. A method for changing a user interface topography, comprising:
- altering a height of a first region of the surface to a first height and concurrently displaying a user interface object in the first region of the surface;
- determining a user interface state, including, while the first region is at the first height and the user interface object is display, sensing a touch event on the surface at one or more touch sensing nodes and determining a surface location of the touch event based on touch information received from the one or more touch sensing nodes; and
- configuring a user interface according to the determined user interface state, including, in response to the determination that the surface location is in the first region of the surface, automatically altering one or more shape changeable nodes at the first region of the surface to alter the height of the first region of the surface to a second height.

22. The method of claim 21, wherein configuring the user interface comprises:
- selecting one or more changeable regions of a surface of the user interface; and
- altering the selected regions to change topography of the user interface.

23. The method of claim 21, wherein configuring the user interface comprises adjusting a shape of the user interface to match preferences of the determined user interface state.

24. The method of claim 21, wherein configuring the user interface comprises configuring touch characteristics of the user interface according to the determined user interface state.

25. The method of claim 24, wherein configuring the touch characteristics comprises setting active touch regions of the user interface configured to detect a touch and null touch regions of the user interface configured ignore a touch, the touch characteristics associated with topography of the user interface.

26. The method of claim 21, wherein configuring the user interface comprises configuring display characteristics of the user interface according to the determined user interface state.

27. The method of claim 26, wherein configuring the display characteristics comprises displaying user interface elements associated with topography of the user interface.

28. The method of claim 21, further comprising receiving an input including at least one of the user interface state and a touch event.

* * * * *